United States Patent [19]

Miyake

[11] Patent Number: 5,680,378

[45] Date of Patent: Oct. 21, 1997

[54] DIGITAL RECORDER FOR RECORDING/ REPRODUCING EVENTS FORMED BY DIVIDING AUDIO DATA IN A DESIGNATED ORDER

[75] Inventor: Atsushi Miyake, Yokohama, Japan

[73] Assignee: Casio Computer Co., Ltd., Tokyo, Japan

[21] Appl. No.: 752,876

[22] Filed: Aug. 30, 1991

[30] Foreign Application Priority Data

Sep. 27, 1990 [JP] Japan .................................. 2-260042
Mar. 6, 1991 [JP] Japan .................................. 3-065522

[51] Int. Cl.$^6$ .................................................. G11B 5/098
[52] U.S. Cl. .................................................. 369/48; 369/32
[58] Field of Search ........................... 360/119.1, 32, 360/48, 8; 369/48, 56, 59, 58, 47, 60, 49, 32; 358/341, 343, 342

[56] References Cited

U.S. PATENT DOCUMENTS

| 4,672,473 | 6/1987 | Sugiyama ............... 358/341 |
| 4,758,907 | 7/1988 | Okamoto et al. ............. 360/48 |
| 4,772,959 | 9/1988 | Amano et al. ............ 360/48 X |
| 4,833,549 | 5/1989 | Yoshimoto et al. ........ 360/19.1 |
| 4,845,571 | 7/1989 | Hirano et al. .............. 358/342 |
| 4,977,550 | 12/1990 | Furiya et al. .............. 369/59 |
| 5,146,370 | 9/1992 | Endo et al. ................ 360/32 |
| 5,303,091 | 4/1994 | Sakurai .................. 360/19.1 |

FOREIGN PATENT DOCUMENTS

| 0122467 | 10/1984 | European Pat. Off. . |
| 0366449 | 5/1990 | European Pat. Off. . |
| 0374921 | 6/1990 | European Pat. Off. . |
| 0426162 | 5/1991 | European Pat. Off. . |
| 3621263 | 1/1988 | Germany . |

OTHER PUBLICATIONS

JAS Journal, Apr. 1989, pp. 16–22.

*Primary Examiner*—Thang V. Tran
*Attorney, Agent, or Firm*—Frishauf, Holtz, Goodman, Langer & Chick

[57] ABSTRACT

A CPU edits audio data stored in a hard disk by referring to an event address table. The event address table serves to store the ID information of each event and the storage position of each event on the hard disk. Pieces of ID information corresponding to the order of reproduction of the events are arranged and stored in a control track. In the reproduction mode, the storage position of each event on the hard disk is detected from the ID information arranged/ stored in the control track, and audio data is read out from the hard disk in a desired order of the events.

6 Claims, 29 Drawing Sheets

| OTS-1 H/M/S/Sample | EVENT | OTS-2 H/M/S/Sample | EVENT | OTS-3 H/M/S/Sample | EVENT |
|---|---|---|---|---|---|
| 00:00:00"00000 | ① | 00:00:00"00000 | ② | 00:00:00"00000 | ③ |
| 00:00:48"00000 | ⑤ | 00:01:12"00000 | ④ | 00:00:48"00000 | ⑥ |
| 00:02:36"00000 | ⑩ | 00:01:48"00000 | ⑨ | 00:02:12"00000 | ⑦ |
|  |  | 00:02:12"00000 | ⑧ | 00:02:42"00000 | ⑪ |

FIG.15

| EVENT NUMBER | ORIGINAL TRACK | START POINT | END POINT | GROUP | ATTRIBUTE |
|---|---|---|---|---|---|
| ① | Tr1 | 00000 | 00799 | | E |
| ② | Tr2 | 10000 | 11199 | | E |
| ③ | Tr3 | 20000 | 20799 | | E |
| ④ | Tr2 | 11200 | 11799 | | E |
| ⑤ | Tr1 | 00800 | 01799 | | E |
| ⑥ | Tr3 | 20800 | 21799 | | E |
| ⑦ | Tr3 | 21800 | 22299 | | E |
| ⑧ | Tr2 | 11800 | 12499 | | E |
| ⑨ | Tr2 | 12500 | 12899 | | E |
| ⑩ | Tr1 | 01800 | 02099 | | E |
| ⑪ | Tr3 | 22300 | 22499 | | E |

FIG. 16

| ITS-1 H/M/S/Sample | EVENT | ITS-2 H/M/S/Sample | EVENT | ITS-3 H/M/S/Sample | EVENT |
|---|---|---|---|---|---|
| 00:00:00"00000 | ① | 00:00:00"00000 | ④ | 00:00:00"00000 | ③ |
| 00:00:48"00000 | ⑤ | 00:00:36"00000 | ④ | 00:00:48"00000 | ⑦ |
| 00:02:36"00000 | ⑩ | 00:01:12"00000 | ④ | 00:01:18"00000 | ⑦ |
|  |  | 00:01:48"00000 | ⑪ | 00:01:48"00000 | ③ |
|  |  | 00:02:00"00000 | ⑪ |  |  |
|  |  | 00:02:12"00000 | ⑨ |  |  |

FIG. 21

| TOTAL EVENT NUMBER | START TIME | END TIME |
|---|---|---|
| TE-1 | 00:00:00"00000 | 00:01:11"47999 |
| TE-2 | 00:01:12"00000 | 00:02:59"47999 |

FIG. 24

| TTS H/M/S Sample | EVENT |
|---|---|
| 00:00:00"00000 | TE-1 |
| 00:01:12"00000 | TE-1 |
| 00:02:24"00000 | TE-2 |

FIG. 25

| EVENT NUMBER | ORIGINAL TRACK | START POINT | END POINT | GROUP | ATTRIBUTE |
|---|---|---|---|---|---|
| ① | Tr1 | 00000 | 00799 | | E |
| ② | Tr2 | 10000 | 11199 | | E |
| ③ | Tr3 | 20000 | 20799 | | E |
| ④ | Tr2 | 11200 | 11799 | | E |
| ⑤ | Tr1 | 00800 | 01799 | | E |
| ⑥ | Tr3 | 20800 | 21799 | | E |
| ⑦ | Tr3 | 21800 | 22299 | | E |
| ⑧ | Tr2 | 11800 | 12499 | | E |
| ⑨ | Tr2 | 12500 | 12899 | | E |
| ⑩ | Tr1 | 01800 | 02099 | | E |
| ⑪ | Tr3 | 22300 | 22499 | | E |
| ⑫ | Tr1 | 00800 | 01199 | | E |
| ⑬ | Tr1 | 01200 | 01799 | | E |
| ⑭ | Tr3 | 21800 | 22199 | | E |
| ⑮ | Tr3 | 22200 | 22299 | | E |

FIG. 26

| ITS-1' H/M/S/Sample | EVENT | ITS-2' H/M/S/Sample | EVENT | ITS-3' H/M/S/Sample | EVENT |
|---|---|---|---|---|---|
| 00:00:00"00000 | ① | 00:00:00"00000 | ④ | 00:00:00"00000 | ③ |
| 00:00:48"00000 | ⑫ | 00:00:36"00000 | ④ | 00:00:48"00000 | ⑭ |
| 00:01:12"00000 | ① | 00:01:12"00000 | ④ | 00:01:12"00000 | ③ |
| 00:02:00"00000 | ⑫ | 00:02:24"00000 | ④ | 00:02:00"00000 | ⑭ |
| 00:02:24"00000 | ⑬ | 00:03:00"00000 | ⑪ | 00:02:24"00000 | ⑮ |
| 00:03:48"00000 | ⑩ | 00:03:12"00000 | ⑪ | 00:02:30"00000 | ⑦ |
|  |  | 00:03:24"00000 | ⑨ | 00:03:00"00000 | ③ |

FIG. 27

| EVENT NUMBER | ORIGINAL TRACK | START POINT | END POINT | GROUP | ATTRIBUTE |
|---|---|---|---|---|---|
| ① | Tr1 | 00000 | 00799 | | E |
| ② | Tr2 | 10000 | 11199 | | E |
| ③ | Tr3 | 20000 | 20799 | | E |
| ④ | Tr2 | 11200 | 11799 | | E |
| ⑤ | | | | 12+13 | G |
| ⑥ | Tr3 | 20800 | 21799 | | E |
| ⑦ | | | | 14+15 | G |
| ⑧ | Tr2 | 11800 | 12499 | | E |
| ⑨ | Tr2 | 12500 | 12899 | | E |
| ⑩ | Tr1 | 01800 | 02099 | | E |
| ⑪ | Tr3 | 22300 | 22499 | | E |
| ⑫ | Tr1 | 00800 | 01199 | | E |
| ⑬ | Tr1 | 01200 | 01799 | | E |
| ⑭ | Tr3 | 21800 | 22199 | | E |
| ⑮ | Tr3 | 22200 | 22229 | | E |
| ⑯ | | | | 6+8 | G |
| ⑰ | | | | 12+15 | G |
| ⑱ | Tr3 | 22400 | 22499 | | B |

FIG. 28

| START | END | |
|---|---|---|
| 00000 | 00799 | EVENT1 |
| 00800 | 01199 | EVENT12 |
| | | |

FIG. 31

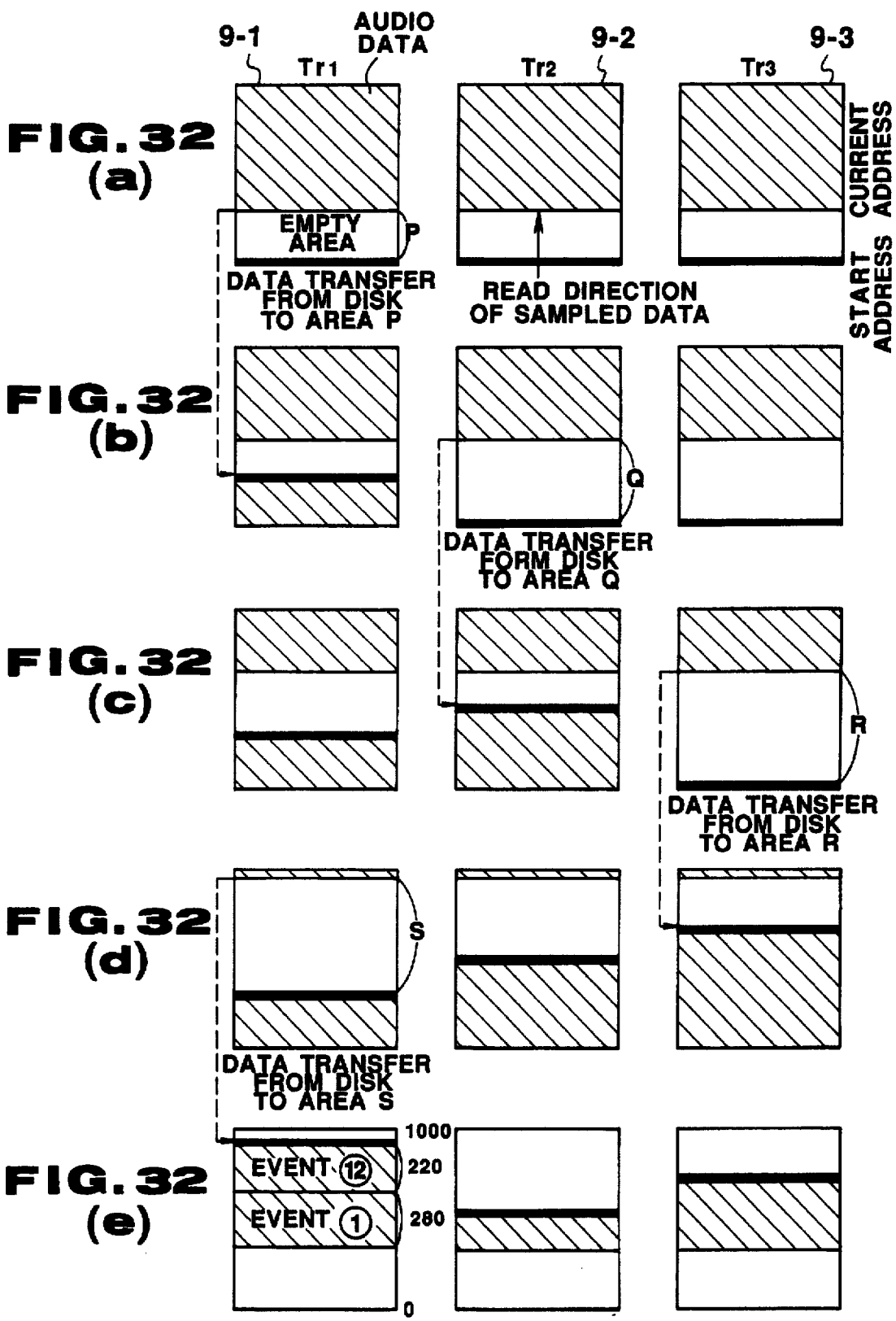

DIGITAL RECORDER FOR RECORDING/ REPRODUCING EVENTS FORMED BY DIVIDING AUDIO DATA IN A DESIGNATED ORDER

BACKGROUND OF THE INVENTION

1. Field of the Invention

The present invention relates to a digital recorder which can digitally record, reproduce, and edit audio signals.

2. Description of the Related Art

In a conventional method of recording, reproducing, and editing audio signals, analog audio signals are magnetically recorded on a magnetic tape, and the recorded audio signals are reproduced and edited. In such a conventional technique, however, a deterioration in sound quality cannot be avoided because of analog recording/reproduction, and the deterioration is conspicuously worsened especially when recorded audio signals are dubbed.

In addition, since a magnetic tape is used as a recording medium, it takes much time to reach a target edit point, and editing cannot be performed unless corresponding portions of the magnetic tape are physically cut and connected or a portion to be edited is copied at another location.

Although the problem of a deterioration in sound quality can be solved by employing a digital recording method as a method of recording audio signals on a magnetic tape, drawbacks associated with a search for a start position of a record and the degree of freedom in editing due to a recording medium of a sequential access scheme cannot be eliminated by simply employing a digital recording method.

Under the circumstances, a data recording technique using a hard disk or an optomagnetic disk has recently been proposed to eliminate the conventional drawbacks. Such a technique is disclosed in, e.g., U.S. Ser. No. 07/690,710 filed on Apr. 24, 1991, Inventor: Nobuo IIZUKA.

In this proposal, however, sufficient consideration is not given to editing of audio data. That is, a disk in which audio data is stored must be accessed every time the audio data is edited, resulting in very complicated processing.

SUMMARY OF THE INVENTION

The present invention has been made in consideration of the above situation, and has as its object to provide a digital recorder which allows easy editing of audio data.

More specifically, it is an object of the present invention to provide a digital recorder which allows editing of audio data without directly accessing a recording medium in which the audio data is stored.

According to an aspect of the present invention, there is provided a system comprising audio data input/output means for performing an input/output operation of audio data, audio data storage means for storing audio data supplied from the audio data input/output means, and event address information storage means for storing identification information of events formed by dividing audio data stored in the audio data storage means into a plurality of portions, and position information representing storage positions thereof.

According to this system, since the event address information storage means includes the storage position of each event in the audio data storage means, an operator who edits audio data can perform edit processing in unit of events, and need not access each address of the audio data storage means.

In addition to the above arrangement, the present invention can further include control information storage means formed by arranging the identification information of the events in the order of reproduction of the events.

With such control information storage means, the audio data of the respective events can be easily reproduced in accordance with the order of reproduction while address control is performed.

According to another aspect of the present invention, there is provided a system comprising audio input/output means for performing input/output operations of audio data in correspondence with a plurality of tracks, audio data storage means having a storage area corresponding to the plurality of tracks and capable of storing audio data supplied from the audio input/output means, event address information storage means for storing identification information and position information of events formed by dividing audio data stored in the audio data storage means into a plurality of portions, and individual control information storage means formed by arranging the identification information of the events, stored in the event address information storage means, in the order of reproduction of the events, for each of the plurality of tracks.

More preferably, in addition to the above arrangement, the present invention further includes total control information storage means for storing identification information arranged in the order of reproduction formed by dividing storage contents of the individual control information means corresponding to the plurality of tracks into a plurality of portions in relation to a time base, and rewrite means for rewriting identification information and arrangement of events, for each track, stored in the individual control information storage means, in accordance with contents stored in the total control information storage means.

With this arrangement, the identification information and arrangement of the events stored in the individual control storage means can be automatically updated by simply forming new contents of the total control information storage means or changing its contents. Therefore, large-scale edit processing can be easily performed.

Furthermore, according to the present invention, there is provided a system comprising audio data storage means for storing audio data of a plurality of events, reproduction order storage means for storing reproduction order information for designating the order of reproduction of digital audio data of events stored in the audio data storage means, and audio data read means for, in accordance with the reproduction order information stored in the reproduction order storage means, sequentially reading out the audio data of events corresponding to the order from the audio data storage means.

That is, it is only required that audio data be stored in the audio data storage means in advance, and hence the audio data input means is not necessarily required. In addition, data for designating the order of reproduction of the respective events can have any type of form. That is, it is only required that the order of reproduction be designated for each event.

It is obvious to a person skilled in the art from the following description of the preferred embodiments of the present invention that the invention can adopt other arrangements, modifications, and applications.

BRIEF DESCRIPTION OF THE DRAWINGS

Additional objects and features of the invention will be obvious to a person skilled in the art from the description of the preferred embodiments of the invention, which will be given with reference to the accompanying drawings.

FIG. 15 is a view for explaining an original track schedule (OTS);

FIG. 16 is a view for explaining an event address table (EAT);

FIG. 21 is a view for explaining an individual track schedule (ITS);

FIG. 24 is a view for explaining a total event table (TET);

FIG. 25 is a view for explaining a total track schedule (TTS);

FIG. 26 is a view for explaining an EAT updated upon TCT execution in FIG. 22;

FIG. 27 is a view for explaining an ITS updated upon TCT execution in FIG. 22;

FIG. 28 is a view for explaining another EAT updated upon TCT execution in FIG. 22;

FIG. 31 is a flow chart showing a reproduction schedule table; and

FIGS. 32(a) to 32(e) are views showing operations of buffers in the reproduction mode in the interrupt routine in FIG. 30.

DETAILED DESCRIPTION OF THE PREFERRED EMBODIMENTS

Digital recorders according to the preferred embodiments of the present invention will be described below with reference to the accompanying drawings.

<Overall Arrangement>

Figure 1:
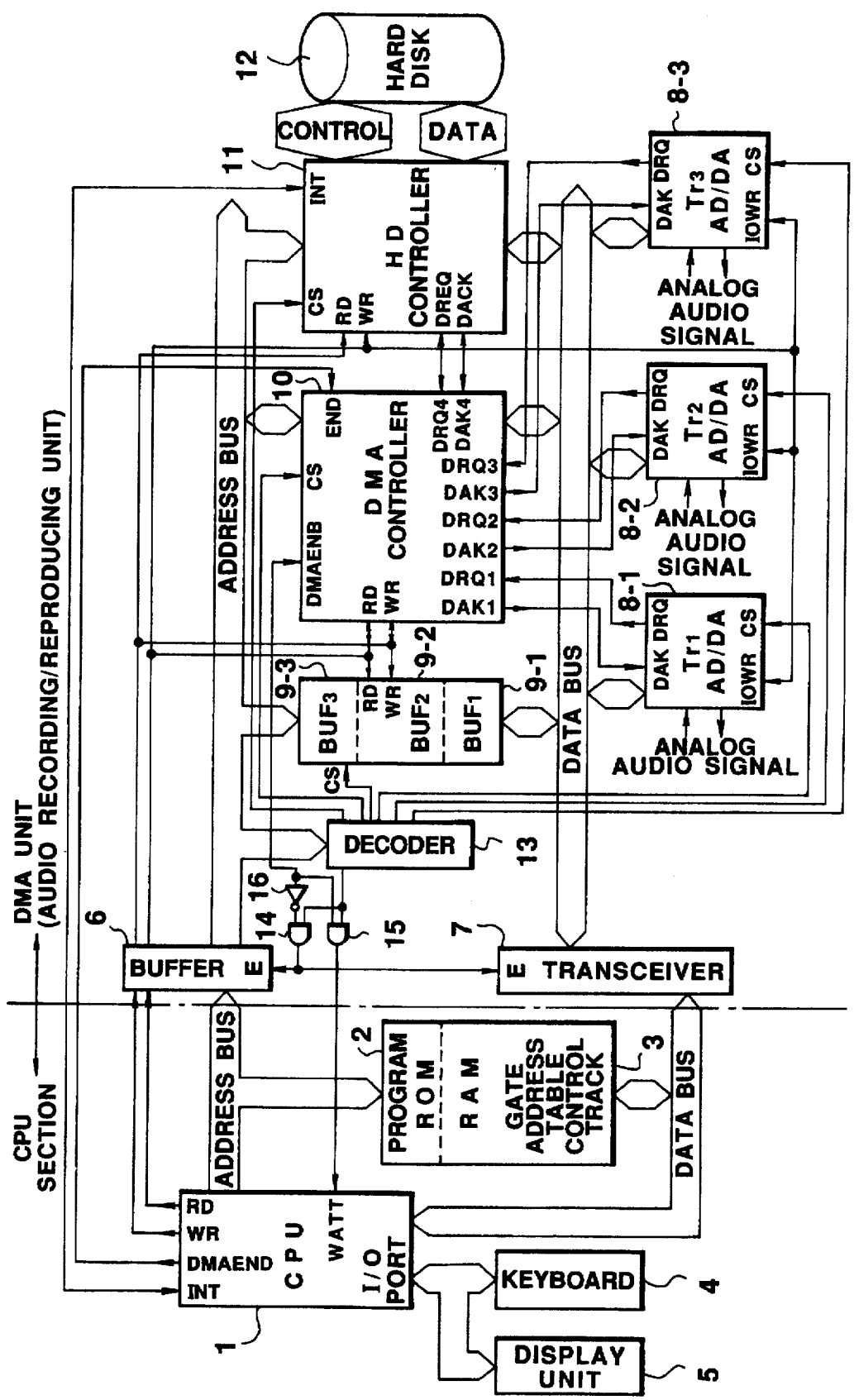
FIG. 1 is a block diagram showing the overall arrangement of a digital recorder according to an embodiment of the present invention.

FIG. 1 shows the overall arrangement of a digital recorder according to an embodiment of the present invention. In this embodiment, data can be recorded/reproduced on/from up to three tracks at the same time. As shown in FIG. 1, the overall arrangement can be divided into a CPU section (on the left side) and a DMA (direct memory access) unit (audio recording/reproducing unit) (on the right side).

The CPU section includes a CPU 1 and a program ROM 2 for storing programs (to be described in detail 10 later), each for defining an operation of the CPU 1. In addition, the CPU section includes a RAM 3 having an area for storing various data, an area for storing the disk access pointers of three tracks, an area for storing an event address table including the ID information (event number) and storage position (original track number, start point, and end point) of each audio data (to be referred to as an "event" hereinafter) obtained by manually or automatically dividing audio data stored in a hard disk 12 into a plurality of portions, an area for storing individual control tracks formed by arranging the ID information of events, included in the event address table, in the order of reproduction in units of tracks, and an area for storing a total control track formed by arranging the ID information of individual control tracks (to be referred to as "total events" hereinafter), obtained by dividing individual control tracks corresponding to a plurality of tracks into a plurality of portions on the time base, in the order of reproduction. Furthermore, the CPU section includes a keyboard 4 and a display unit 5 as peripheral devices connected to the I/O ports of the CPU 1. The keyboard 4 includes, e.g., various function keys and data input keys. The display unit 5 includes a CRT or an LCD and its driver and serves to perform various types of display operations.

As will be described later, in a real time operation (e.g., a recording/reproduction operation), the CPU 1 controls the respective components of the DMA unit as needed while the address and data buses of the DMA unit are free. In an editing operation, the CPU 1 rearranges data blocks or operates disk access pointers. For example, by using the keyboard 4, an operator cam set the recording/reproducing mode, enter start, stop, and locate commands, and designate an edit point with respect to each track (to be referred to as a Tr hereinafter), as will be described below. Address signals are supplied from the CPU 1 to the address terminals of the program ROM 2 and the RAM 3 through the address bus. The output terminals of the ROM 2 and the RAM 3 are connected to the CPU 1 and a transceiver 7 through the data bus.

A buffer 6 and the transceiver 7 are arranged in the DMA unit to connect the CPU section and the DMA unit to each other. The buffer 6 is connected to the CPU 1 through the address bus and is further connected to the address bus in the DMA unit. The transceiver 7 is connected to the CPU 1 through the data bus and is further connected to the data bus in the DMA unit.

The DMA unit incorporates an audio input/output unit 8-1 for Tr1, an audio input/output unit 8-2 for Tr2, and an audio input/output unit 8-3 for Tr3. These input/output units 8-1 to 8-3 can independently receive and output analog audio signals.

Each of the audio input/output units 8-1 to 8-3 incorporates a converter for selectively performing A/D or D/A conversion, a low-pass filter for removing sampling noise, a clock circuit for generating clocks at a sampling period, and the like. In each of the audio input/output units 8-1 to 8-3, if the corresponding track is set in a recording state, an external analog audio signal is properly filtered at the sampling period and is subsequently A/D-converted to obtain digital audio data. In contrast to this, if the track is set in a playback state, digital audio data read from the track in advance is D/A-converted and properly filtered at the sampling period, thus outputting the resulting signal as an analog audio signal.

The audio input/output units 8-1 to 8-3 for Tr1 to Tr3 are respectively connected to a buffer 9-1 (BUF 1), a buffer 9-2 (BUF 2), and a buffer 9-3 (BUF 3) through the data bus so as to perform communication of digital audio data therebetween.

These buffers 9-1 to 9-3 correspond to Tr1 to Tr3, respectively. Data transfer between the buffers 9-1 to 9-3 and the audio input/output units 8-1 to 8-3 is performed by a DMA controller 10 using the direct memory access (DMA) scheme.

In the recording mode, the audio input/output units 8-1 to 8-3 request (transmit signals DRQ (DRQ1 for Tr1, DRQ2 for Tr2, and DRQ3 for Tr3 are supplied to the DMA controller 10)) the DMA controller 10 to perform DMA transfer (signal transfer) of digital data, associated with one sampling operation, from the audio input/output units 8-1 to 8-3 to the buffers 9-1 to 9-3 at the sampling period, and receive ACK signals from the DMA controller 10 (DAK1 for Tr1, DAK2 for Tr2, and DAK3 for Tr3 are supplied as ACK signals from the DMA controller 10). With this operation, actual data transfer is executed. In the playback mode, the audio input/output units 8-1 to 8-3 request DMA transfer (signal transfer) of digital data, associated with one sampling operation, from the buffers 9-1 to 9-3 to the audio input/output units 8-1 to 8-3 at the sampling period, and data transfer is executed by the DMA controller 10 in the same manner as described above.

Each of the buffers 9-1 to 9-3 has a capacity enough to store digital audio data obtained by one or a plurality of sampling operations. For example, a RAM is divided into three equal areas for Tr1 to Tr3, and used as a ring buffer (a buffer whose last and start addresses are virtually continuous), thus obtaining the function of a FIFO buffer.

Address designation with respect to the buffers 9-1 to 9-3 is performed by the DMA controller 10 and the like through the address bus. That is, while DMA transfer is performed, the address bus, the data bus, and the control signal line in the DMA unit are exclusively used by the DMA controller 10.

The buffers 9-1 to 9-3 exchange data with the hard disk 12 under the control of a hard disk controller (to be referred to as an HD controller hereinafter) 11. The hard disk 12 and the HD controller 11 are connected to each other through the data bus and the control signal line. All read/write access operations with respect to the hard disk 12 are performed by the HD controller 11. The hard disk 12 has divided storage areas corresponding to the three tracks, i.e., Tr1 to Tr3. Data transfer between the hard disk 12 and the buffers 9-1 to 9-3 is performed by the DMA controller 10. This transfer operation is controlled by the HD controller 11 by supplying an interrupt signal (INT) to the CPU 1 upon completion of transfer of one data block, and designating transfer of the next data block with respect to the CPU 1. In response to the interrupt signal INT from the HD controller 11, the CPU 1 sets the DMA controller 10 and the HD controller 11 in desired states or programs them, and subsequently causes them to perform DMA transfer. This operation will be described in detail below.

In the playback mode, the DMA controller 10 operates to read out a designated amount of digital audio data (corresponding to a plurality of sampling periods) from the hard disk 12, and to subsequently perform DMA transfer (block transfer) of the data to a designated one of the buffers 9-1 to 9-3. In the recording mode, the DMA controller 10 operates to read out a designated amount of digital audio data (corresponding to a plurality of sampling periods) from a designated buffer, and to subsequently perform DMA transfer (block transfer) of the data to a designated position on the hard disk 12.

When data transfer is to be performed between the hard disk 12 and the buffers 9-1 to 9-3, a request signal DREQ (received as DRQ4 by the DMA controller 10) is output from the HD controller 11 to the DMA controller 10. When transfer is allowed, the HD controller 11 receives an ACK signal DACK (output as DAK4 from the DMA controller 10). With this operation, actual data transfer is started.

In this manner, the DMA controller 10 performs a time division data transfer operation through a total of four channels, i.e., three channels (channels CH1 to CH3 to be described later) between the audio input/output units 8-1 to 8-3 and the buffers 9-1 to 9-3 for Tr1 to Tr3, and one channel (a channel CH4 to be described later) between a sequentially selected one of the buffers 9-1 to 9-3 and the hard disk 12.

In order to manage the functions and operations of the respective components in the DMA unit, the CPU 1 supplies an address signal to the buffer 6 through the address bus, and supplies command signals for the respective components to a decoder 13 through the buffer 6, thus supplying command signals CS to the audio input/output units 8-1 to 8-3, the buffers 9-1 to 9-3, the DMA controller 10, and the HD controller 11. At the same time, communication of various data is performed between the CPU 1 and the respective components through the transceiver 7 and the data bus.

In addition, a command signal WR for designating a recording state (write state) or a playback state (read state) is supplied from the CPU 1 to a terminal IOWR of each of the audio input/output units 8-1 to 8-3 through the buffer 6.

Furthermore, this command signal (write signal) WR and another command signal (read signal) RD are supplied from the CPU 1 to the buffers 9-1 to 9-3, the DMA controller 10, and the HD controller 11, thus reading out data from each component or writing data therein. During DMA transfer, these command signals RD and WR are also output from the DMA controller 10. The relationships between these signals and the functions and operations of the respective components will be described later.

In the process of DMA transfer between the respective components, the DMA controller 10 sets a DMA enabling signal DMAENB at "1" and outputs it to an AND gate 147 through an inverter 16. As a result, an output from the AND gate 14 is set at "0", and an enabling signal E is supplied, as "0", to the buffer 6 and the transceiver 7. With this operation, the exchange of data and address between the CPU section and the DMA unit is inhibited. At this time, if a "1"-level signal is supplied from the decoder 13 to an AND gate 15, an output from the AND gate 15 is set at "1" to supply a wait signal WAIT to the CPU 1.

That is, if DMA transfer is started while the CPU 1 supplies a predetermined signal to the decoder 13 to enable the buffer 6 and the transceiver 7 so as to manage the DMA unit, i.e., a "1"-level signal is supplied from the decoder 13 to one input terminal of the AND gate 14 (if the CPU 1 outputs an address signal for accessing one of the buffers 9-1 to 9-3, the DMA controller 10, the HD controller 11, and the audio input/output units 8-1 to 8-3, an output from the decoder 13 is rendered active, and a "1"-level output is supplied to one input terminal of each of the AND gates 14 and 15), a wait signal (WAIT) is supplied to the CPU 1 upon start of DMA transfer, and after DMA transfer is preferentially executed, the CPU 1 resumes its operation upon cancellation of the wait state.

In contrast to this, even if the CPU 1 tries to access, e.g., the DMA controller 10 while the DMA controller 10 is executing DMA transfer, the wait signal WAIT is supplied from the AND gate 15 to extend the execution cycle of the CPU 1, and the buffer 6 and the transceiver 7 are disabled during this period.

That is, the CPU 1 can access a given component of the DMA unit only when the following two conditions are satisfied:
1. The CPU 1 outputs an address for accessing the given component of the DMA unit.
2. The signal DMAENB is inactive ("0"), i.e., the data bus of the DMA unit is free.

The CPU 1, however, can proceed with processing without considering the timing of access to the DMA unit owing to the function of the gates 14 and 15.

In addition, the CPU 1 can immediately change the operation state of the DMA unit in response to a key input or a trigger signal as control data by outputting a command DMAEND (supplied, as a signal END, to the DMA controller 10) for stopping DMA transfer regardless of the state of the DMA controller 10.

<Arrangement of Main Components of DMA Controller 10>

An arrangement of the DMA controller 10 will be described below. The DMA controller 10 has a transfer capability to complete one bus cycle within several hundred nanoseconds. Therefore, the time required to transfer sampled data corresponding to three tracks is 1 to 2 microseconds.

If a sampling frequency fs is set to be 48 kHz, one sampling time interval is about 21 microseconds, and most of the sampling time interval can be assigned to data transfer between the buffers 9-1 to 9-3, the HD controller 11, and the hard disk 12, and to a programming operation performed by the CPU 1 with respect to each component.

Figure 2:
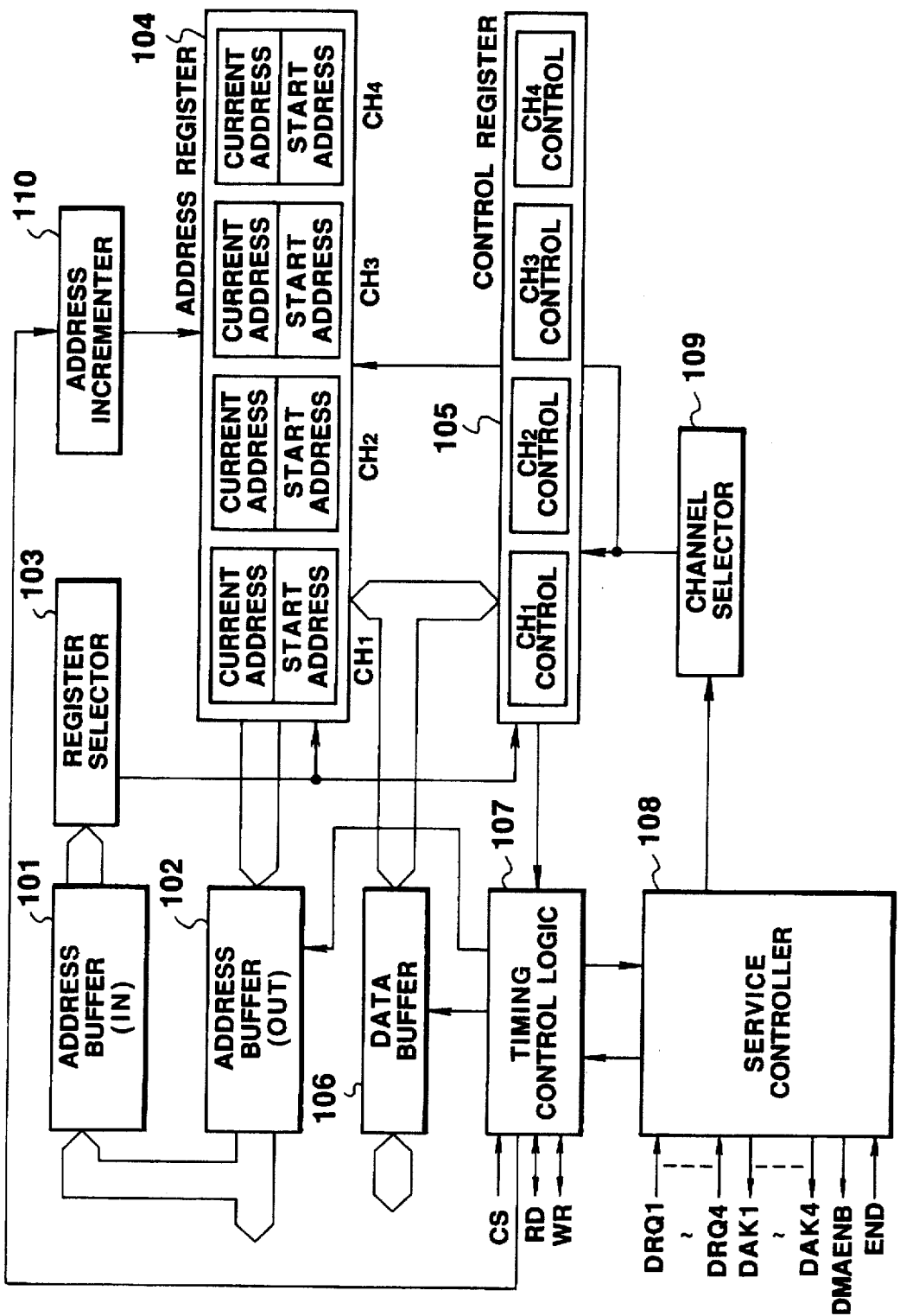
FIG. 2 is a block diagram showing a detailed arrangement of the main components of a DMA controller 10 in FIG. 1.

FIG. 2 shows a detailed arrangement of the main components of the DMA controller 10. The DMA controller 10 includes an input-side (IN) address buffer 101 and an output-side (OUT) address buffer 102 connected to the address bus. The designated contents of a register selector 103 are changed by an address signal supplied to the input-side address buffer 101 to designate desired registers which are present in an address register 104 and a control register 105.

Each of the address register 104 and the control register 105 has areas for four channels CH1 to CH4. The channels CH1 to CH3 are registers for performing DMA transfer between the buffers 9-1 to 9-3 and the audio input/output units 8-1 to 8-3, and the channel CH4 is a register for performing DMA transfer between a designated one of the buffers 9-1 to 9-3 and the hard disk 12.

The registers of the channels CH1 to CH4 in the address register 104 have areas for storing at least the current and start addresses of the corresponding buffers 9-1 to 9-3 and a designated buffer. Control data for designating, e.g., the direction of DMA transfer is stored in the area for each of the channels CH1 to CH4 in the control register 105.

The contents of the address register 104 and the control register 105 can be input/output with respect to the data bus through a data buffer 106. These components are controlled by a timing control logic 107, a service controller 108, and a channel selector 109.

The service controller 108 is based on a hard logic or microprogram control scheme. The service controller 108 receives a signal from the timing control logic 107, the DMA request signals DRQ1 to DRQ4 from the audio input/output units 8-1 to 8-3 and the HD controller 11, and the DMA stop command END (DMAEND) from the CPU 1, and outputs the ACK (acknowledgement) signals DAK1 to DAK4 to the respective components and the DMA enabling signal DMAENB representing that DMA transfer is being performed. In addition, the service controller 108 outputs various commands to the timing control logic 107, and a channel select signal to the channel selector 109. The channel selector 109 selectively designates registers, of the address and control registers 104 and 105, which correspond to each of the channels CH1 to CH4.

The timing control logic 107 receives the command signal CS from the decoder 13, a control signal from the control register 105, and a control signal from the service controller 108, and performs input/output control of the address buffer 102 and the data buffer 106, and operates an address incrementer 110 to increment the current address register of a designated channel of the address register 104.

<Overall Operation of CPU 1>

Figure 3:
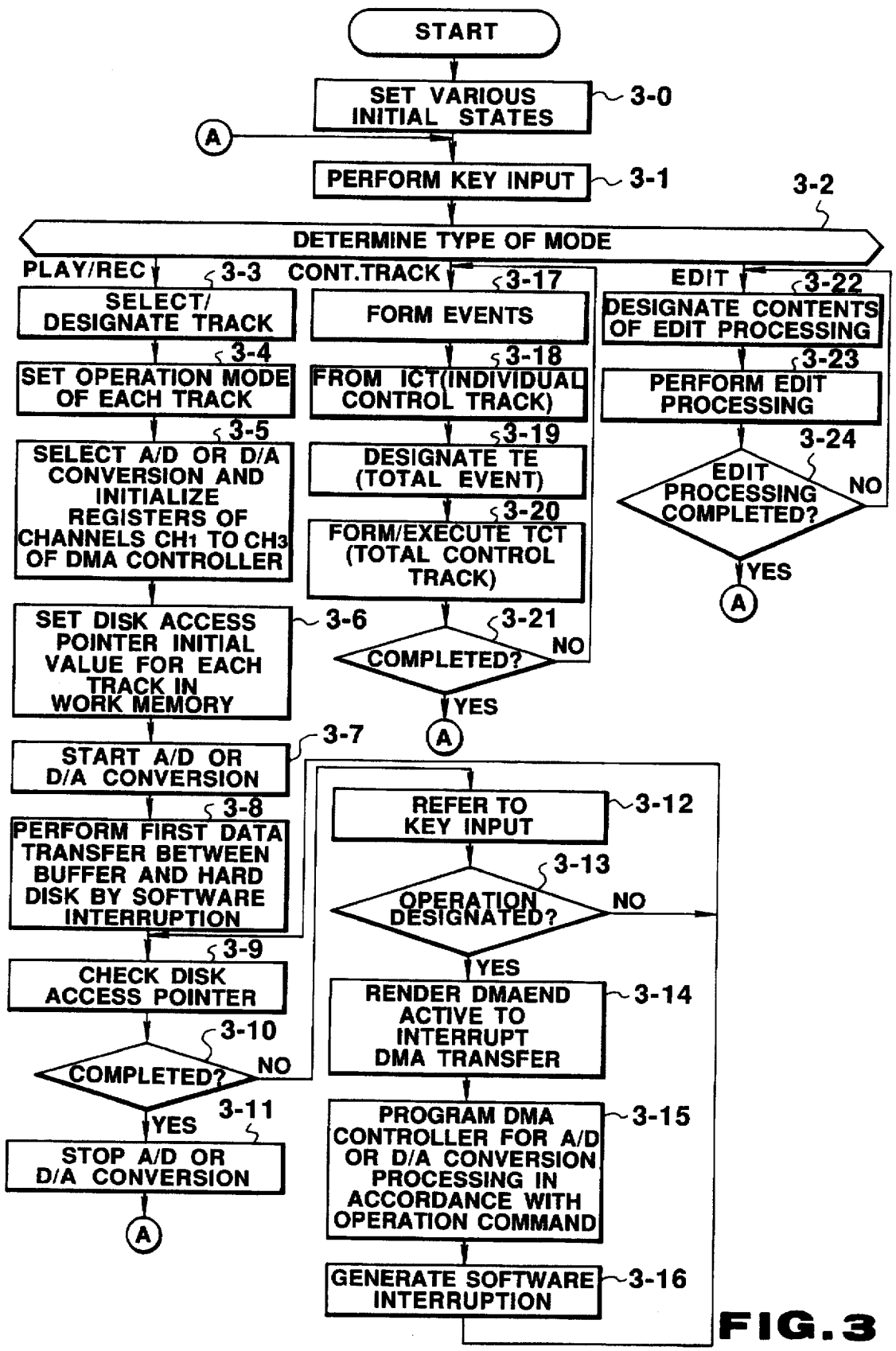
FIG. 3 is a flow chart showing the main routine of a CPU in FIG. 1.
Figure 4:
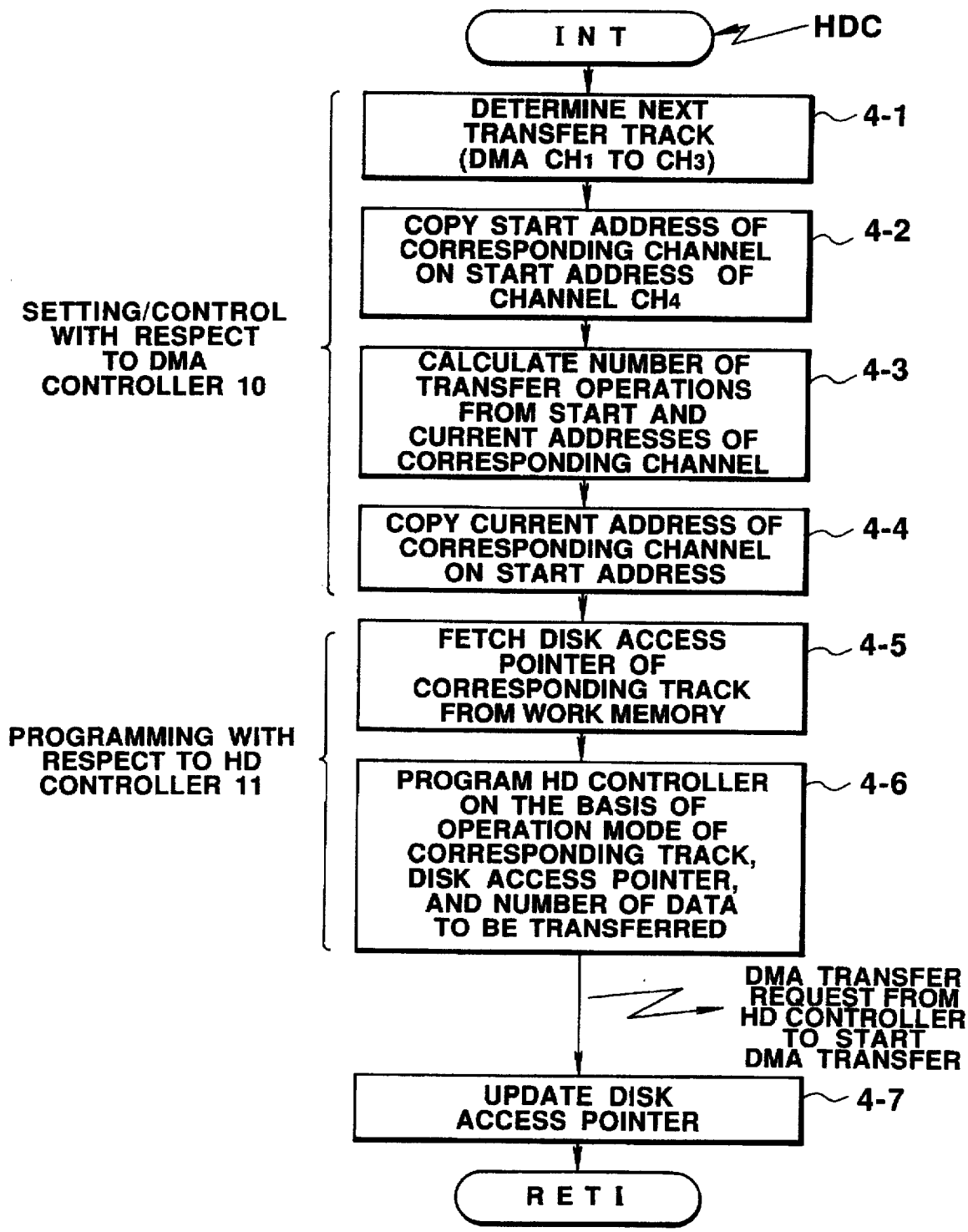
FIG. 4 is a flow chart showing the interrupt routine of the CPU in FIG. 1.

An operation of this embodiment will be described below. FIGS. 3 and 4 are flow charts showing operations of the CPU 1. These operations are based on programs (software) stored in the program ROM 2. FIG. 3 shows a main routine. FIG. 4 shows an interrupt routine to be executed in response to the interrupt signal INT from the HD controller 11.

Referring to FIG. 3, when the power source is turned on, the CPU 1 starts the main routine and sets various initial states in step 3-0 (to be simply referred to as 3-0 hereinafter). The CPU 1 receives a key input in 3-1, and determines the type of a set mode in 3-2.

Figure 8:
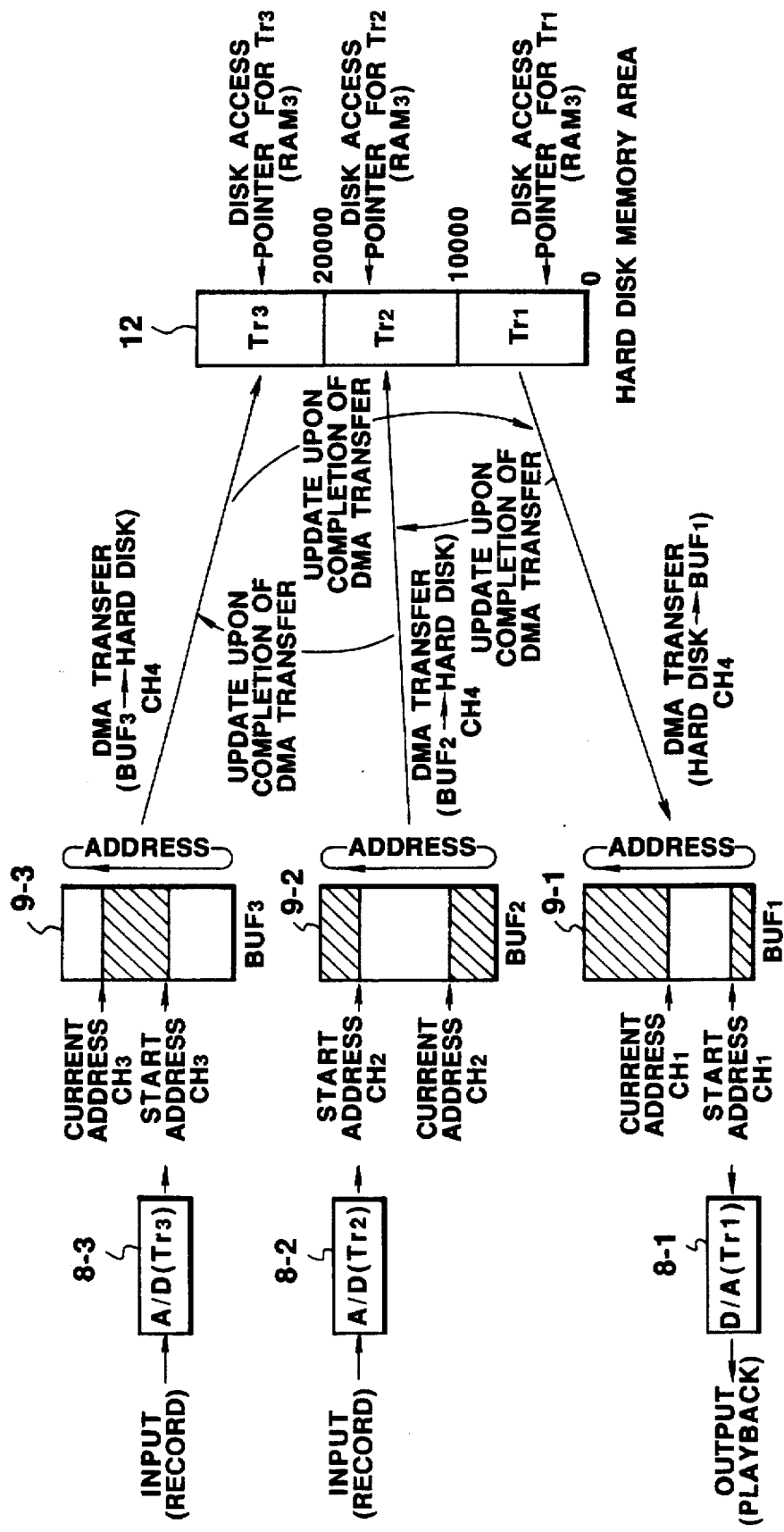
FIG. 8 is a view showing the overall operation of the digital recorder in FIG. 1.

If the CPU 1 judges that the playback/recording mode is currently set, the flow advances from 3-2 to to sequentially select/designate three tracks. The flow then advances to 3-4 to set the operation of each track in accordance with an input command from the keyboard In 3-5, the CPU 1 sequentially outputs the command signals CS to the terminals IOWR of the audio input/output units 8-1 to 8-3 through the buffer 6 and the decoder 13 so as to select A/D conversion or D/A conversion to be executed. Assume that a playback state (i.e., D/A conversion state) is selected for Tr1, and a recording state (i.e., A/D conversion state) is selected for Tr2 and Tr3. FIG. 8 schematically shows an operation in such mode setting.

In 3-5, the CPU 1 causes the DMA controller 10 to initialize the address of the buffers 9-1 to 9-3 for Tr1 to Tr3. More specifically, the CPU 1 causes the address buffer 101, the register selector 103, the channel selector 109, and the like to designate each register (the address and control registers 104 and 105) of the channels CH1 to CH3 and input initialization data therein through the data buffer 106.

In this case, the buffers 9-1 to 9-3 are cyclically used as a ring buffer. In an initial state, the start and current address of each of the buffers 9-1 to 9-3 are set to coincide with each other (FIG. 8 illustrates a state wherein the start and current addresses of the buffers 9-1 to 9-3 are stored in the address register 104 for the channels CH1 to CH3 to be controlled).

The CPU 1 executes processing in 3-6 to initialize disk access pointers, corresponding to Tr1 to Tr3 of the hard disk 12, which exist in the work memory area of the RAM 3 (FIG. 8 shows the relationships between the storage areas of the hard disk 12 and the disk access pointers).

Subsequently, the CPU 1 causes the audio input/output units 8-1 to 8-3 to start A/D conversion or D/A conversion (3-7). In 3-8, the CPU 1 generates a software interruption to execute the same processing (to be described later) as that performed when the HD controller 11 makes a program request for data transfer between the hard disk 12 and one of the buffers 9-1 to 9-3 (the HD controller 11 sends the interrupt signal INT to the CPU 1).

More specifically, in 3-8, the CPU 1 executes an operation in accordance with the flow chart shown in FIG. 4. For example, in this case, the channel CH1 corresponding to Tr1 is determined as a channel for the DMA controller 10 (4-1) in order to perform DMA transfer of digital signal data of Tr1 from the hard disk 12 to the buffer 9-1.

Subsequently, the start address (initialized in as described above) of the channel CH1 is copied as the start address of the channel CH4 (4-2). An operation of the DMA controller 10 side at this time will be described later. In this case, the number of data transfer operations is calculated from the start and current address of the channel CH1 (4-3). Since the initial state is currently set, with respect to Tr1, no data transfer is performed to the buffer 9-1. Therefore, data can be transferred from the hard disk 12 to the whole memory area of the buffer 9-1. Assume that a plurality of tracks are in the playback mode. In this case, it is apparent that since prestored digital audio data must soon be transferred from the hard disk 12 to a plurality of buffers, DMA transfer may be sequentially performed for the respective tracks without fully transferring data to one buffer. Alternatively, after data is fully transferred from the hard disk 12 to required buffers of the buffers 9-1 to 9-3, the playback/recording operation may be synchronously started.

In 4-4, the contents of the current address of the channel CH1 are copied on the start address of the channel CH4. In this case, the initial address becomes a start address.

In this manner, the CPU 1 performs the setting/control operations with respect to the DMA controller 10 in 4-1 to 4-4. Thereafter, the flow advances to 4-5 to fetch the disk access pointer of Tr1 from the work memory area of the RAM 3. In 4-6, the CPU 1 performs programming of the HD controller 11 on the basis of the operation mode (playback mode), of Tr1, which is obtained in accordance with the contents of the area for CH1 in the control register 105 of the DMA controller 10, the disk access pointer of Tr1, and the number of transfer operations from the hard disk 12 to the buffer 9-1, which is determined in 4-3. An operation of the HD controller 11 side at this time will be described in detail later.

Consequently, the HD controller 11 requests the DMA controller 10 (outputs the request signal DREQ) to perform DMA transfer from the hard disk 12 to the buffer 9-1, and the DMA controller 10 executes the corresponding DMA transfer. This operation will also be described in detail later.

Subsequently, in 4-7, the CPU 1 updates the disk access pointer of Tr1 in the work memory area of the RAM 3 to obtain a value which the disk access pointer is expected to take after the execution of the transfer processing described above. More specifically, as is apparent from the above description, all data transfer between the hard disk 12 and the buffer 9-1 is subsequently executed by the DMA controller 10, and, in 4-7, the CPU 1 sets a value which the access pointer of the hard disk 12 is expected to take upon completion of the DMA transfer. The flow then returns to the main routine (FIG. 3).

As will be apparent from the following description, once the first interrupt routine (FIG. 4) is started, and the HD controller 11 is operated, an interruption is generated by the HD controller 11 (the interrupt signal INT is supplied to the CPU 1) every time transfer of a data block designated by the CPU 1 is completed. Therefore, the CPU 1 only performs determination as to whether the recording/reproducing operation is completed, or a key input is received, or triggering is performed as designated in control data.

More specifically, the CPU 1 checks the disk access pointer (RAM 3) in 3-9, and judges (3-10) whether the memory area is over i.e., the transfer is completed. If YES in 3-10, the CPU 1 stops A/D or D/A conversion in the audio input/output units 8-1 to 8-3 (3-11), and the flow returns to 3-1. If NO in 3-10, the CPU 1 refers to a key input state (3-12). If there is no change, the flow returns to 3-9 to check the disk access pointer. Subsequently, the processing in 3-9 to 3-13 is repeated.

If a change is determined in 3-13, the flow advances to 3-14 to output a DMA stop command (DMAEND) to the DMA controller 10 so as to temporarily stop the DMA transfer and perform a new setting operation. Subsequently, the CPU 1 programs the DMA controller 10 and the audio input/output units 8-1 to 8-3 in accordance with new input commands or the like (3-15), and the flow advances to 3-16 to execute the interrupt routine in FIG. 4 in the same manner as in 3-8 described above so as to resume the DMA transfer. Thereafter, the flow returns to 3-9.

As described above, in the playback/recording mode, upon initialization in 3-4 to 3-8, the CPU 1 repeatedly executes the processing in 3-9, 3-10, 3-12, and 3-13, in addition to the processing in 3-14 to 3-16, and immediately stops DMA transfer control and changes a program in response to a change command (e.g., a pause command (for stopping A/D conversion or D/A conversion) with respect to a given track, a punch-in/punch-out command (for switching A/D conversion and D/A conversion), or the like), or a change in control data obtained by editing. Then, the CPU 1 executes the same processing again.

If the CPU 1 determines in 3-2 that a control track mode is currently set, the flow advances to 3-17 to form audio data stored in the hard disk 12 into events. In the formation of events, continuous audio data on the time base is divided into a plurality of audio data portions by manual designation or the like, and event numbers for identifying the respective divided audio data portions (events) and data (start and end points) representing the respective divided intervals are formed. The event numbers and the start and end points are registered in the event address table (EAT) of the RAM 3. The start and end points of a given event correspond to start and end addresses, of the hard disk 12, at which the event is stored. FIGS. 16, 26, and 28 respectively show event address tables. The event address tables will be described later with reference to FIGS. 11, 12, 16, 26, and 28.

When the formation of events is completed, individual control tracks (ICTs) are formed in 3-18. The ICTs are formed by arranging the ID information (event numbers) of the events, included in the event address table (EAT), in the order of reproduction in units of tracks. The formation of ICTs will be described later with reference to FIGS. 18 and 19. In addition, examples of ICTs will be described later with reference to FIG. 20.

When the formation of individual control tracks (ICTs) is completed, total events (TEs) are designated by a manual designation operation or the like in 3-19. The TE is one of a plurality of data obtained by dividing ICTs for a plurality of tracks in relation to the time base. The designation of TEs means that pieces of ID information (e.g., TE1 and TE2) are affixed to the TEs and are registered in a total event table (TET). As will be described later with reference to FIG. 24, the TET includes the start time and end time of each When the designation of the total events (TEs) is completed, a total control track (TCT) is formed and executed in 3-20. The TCT is formed by arranging the pieces of ID information of the TEs in the order of reproduction. When the TCT is executed, the pieces of ID information (event numbers) of the events included in the ICTs and the arrangement thereof are rewritten In accordance with the TCT. TCT processing will be described later with reference to FIG. 22. An example of TCT will be described later with reference to FIG. 23. When the end of the control track mode is detected in 3-21, the CPU 1 checks a key input in 3-.1 again.

If the CPU 1 determines in 3-2 that an edit mode is currently set, the flow advances to 3-22. In 3-22, the CPU 1 determines a track to be edited, an edit point, and the type of editing operation (e.g., backward or forward shifting of the timing of a sound recorded at a designated time point, correction, or omission), and executes a corresponding type of editing operation (3-23). In this editing operation, although not described in detail, a program associated with an access point for reading data from the hard disk 12 to the HD controller 11 and the DMA controller 10, data transfer to the RAM 3, various types of editing operations using the RAM 3, an operation of re-storing digital audio data, obtained after an editing operation, in the hard disk 12, designation of an access point, and the like are executed under the control of the CPU 1. If the end of the editing operation is detected in 3-24, the CPU 1 checks a key input again in 3-1.

<Operations of Audio Input/Output Units 8-1 to 8-3>

Operation states of the audio input/output units 8-1 to 8-3 will be described below with reference to FIG. 5. The flow chart shown in FIG. 5 may be based on microprogram control or hard logic control. That is, various types of function realizing means can be selected.

In 5-1, it is Judged whether the command signal CS is supplied from the CPU 1 to each of the audio input/output units 8-1 to 8-3 (whether the command signal CS is active). If YES in 5-1, an operation state (e.g., recording, playback, or stop state) is set by the CPU 1 in 5-2. This operation is performed in response to the processing in 3-5 and 3-15 in the main routine of the CPU 1 shown in FIG. 3.

If NO in 5-1, it is checked in 5-3 whether the audio input/output units 8-1 to 8-3 are in the recording mode or the playback mode. If it is determined that they are in the recording mode, the flow advances to 5-4 to 5-9. If it is determined that they are in the playback mode, the flow advances to 5-10 to 5-15.

Operations of the audio input/output units (8-2 and 8-3 in this case) set in the recording mode will be described below. In 5-4, it is checked whether a sampling timing has come. The operation in 5-4 is repeated until the sampling timing comes. Determination of a sampling timing may be performed on the basis of an output from a hard timer which is arranged in each of the audio input/output units 8-1 to 8-3. Alternatively, a common hard timer may be arranged so that each audio input/output unit is operated in accordance with an output from the timer. As will be understood from the following description, the audio input/output units 8-1 to 8-3 may have different sampling frequencies.

If YES in 5-4, a supplied analog audio signal is sampled/held and A/D-converted. In 5-6, the DMA transfer request signal DRQ is rendered active and output to the DAM controller 10.

In response to the request signal DRQ, the DMA controller 10 outputs the ACK signal DAK to perform DMA transfer (the operation in this case will be described in detail below). If YES in 5-7, the flow advances to 5-8. In 5-8, the audio input/output units 8-1 to 8-3 (in this case, the audio input/output units 8-2 and 8-3 in the recording mode) output digital audio data, obtained by A/D conversion, to the data bus to transfer the data to the corresponding buffers 9-1 to 9-3 (in this case, the buffers 9-2 and 9-3). In 5-9, the DMA transfer request signal DRQ is rendered inactive. In this case, therefore, the audio input/output units 8-2 and 8-3 convert externally supplied analog signals into digital audio signals at the sampling period, and transfer them to the current addresses of the buffers 9-2 and 9-3 respectively designated by the DMA controller 10, as will be described later.

If a playback state is determined in 5-3, the flow advances to 5-10 to active the DMA transfer request signal DRQ with respect to the DMA controller 10 render. Upon reception of the ACK signal DAK from the DMA controller 10 (5-11), the CPU 1 fetches digital audio data on the data bus (5-12), and renders the request signal DRQ inactive (5-13). An operation of the DMA controller 10 at this time will be described later. In this case, as shown in FIG. 8, with the above-described operation, the current address (the contents of the area for Tr1 of the hard disk 12 has already been transferred/recorded), in the buffer 9-1, which corresponds to Tr1 is input/set in the audio input/output unit 8-1. Subsequently, it is checked whether a sampling timing has come (5-14). The detection of this sampling timing is the same operation as in 5-4.

If YES in 5-14, the flow advances to 5-15. In 5-15, after D/A conversion and low-pass filtering are executed, the resulting analog audio signal is output.

The above description is associated with the operations at one sampling timing in the recording state and the playback state. Upon completion of the processing in 5-9 and 5-15, the flow returns to 5-1. Subsequently, processing associated with sampling timings is sequentially executed in the same manner as described above.

Figure 9:
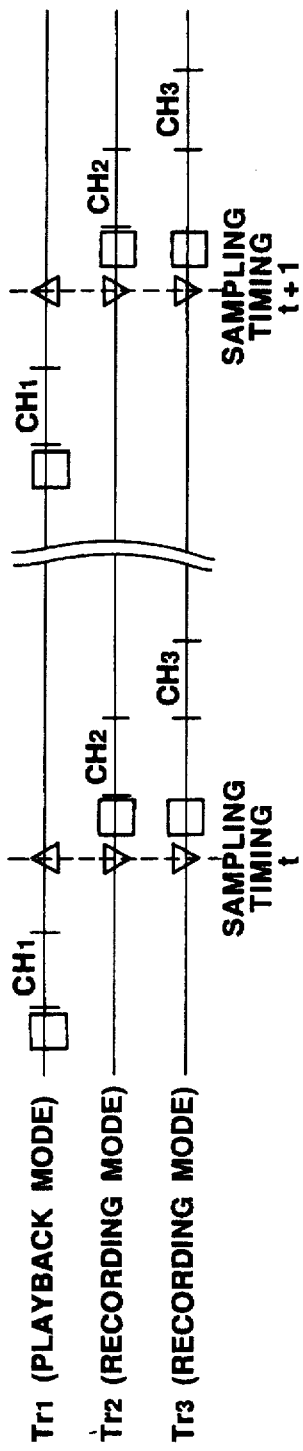
FIG. 9 is a timing chart showing D/A and A/D conversion and DMA transfer in units of tracks.

FIG. 9 is a timing chart showing operations of the audio input/output units 8-1 to 8-3. In this case, the audio input/output unit 8-1 for Tr1 is set in the playback mode. In this mode, a sampling request (DRQ) is generated between a sampling timing t and a sampling timing t+1, DMA transfer from the buffer 9-1 to the audio input/output unit 8-1 is performed by controlling the channel CH1 in the DMA controller 10, and D/A conversion is performed in synchronism with the sampling timing t+1.

In contrast to this, in this case, the audio input/output units 8-2 and 8-3 for Tr2 and Tr3 are in the recording mode. In this mode, A/D conversion is performed in synchronism with the sampling timing t or t+1, and a DMA transfer command is subsequently output to the DMA controller 10. DMA transfer is executed in the order of Tr2 and Tr3 (because the order of priority with respect to simultaneous DMA requests is set as follows: CH1>CH2>CH3>CH4), thus performing data transfer from the audio input/output units 8-2 and 8-3 to the buffers 9-2 and 9-3.

<Operation of DMA Controller 10>

An operation of the DMA controller 10 will be described below with reference to FIG. 6. The flow chart shown in FIG. 6 may be regarded as a sequence of operations performed by the service controller 108 in FIG. 2 by means of microprogram control, or as a function realized by the DMA controller 10 by means of hard logic control.

In 6-1, it is checked whether the command signal CS from the CPU 1 is received (active). If YES in 6-1, it is checked whether the read signal RD or the write signal WR is supplied from the CPU 1. If the read signal RD is supplied, the flow advances to 6-3 to output the contents of the registers 104 and 105, which are designated by address signals supplied through the address bus, to the data bus so as to allow the CPU 1 to read them. In contrast to this, if the write signal WR is received, the flow advances to 6-4 to input/set desired data in designated registers through the data bus. The processing in 6-3 and 6-4 corresponds to the processing in 3-5 and 3-15 in the main routine of the CPU 1. With the processing in 6-4, the desired data are respectively set in the registers 104 and 105 in FIG. 2.

When such access from the CPU 1 to the DMA controller 10 and the execution of an associated program are completed, the command signal CS is rendered inactive, and the flow advances from 6-1 to 6-5.

In 6-5, it is checked whether the DMA transfer request signals DRQ1 to DRQ3 are supplied from the audio input/output units 8-1 to 8-3, and the DMA transfer request signal DRQ (DRQ4) is supplied from the HD controller 11. If any one of the request signals is received, the flow advances to 6-6 to set the DMA enabling signal DMAENB at "1" (active) to allow the DMA controller 10 to exclusively use the address bus and the data bus in the DMA unit, thus inhibiting access from the CPU 1.

If a plurality of request signals are received, channel selection is performed in accordance with the order of priority, i.e., from the channel CH1 to the channel CH4 (6-7). For example, in the case shown in FIG. 9, although data transfer request signals are simultaneously output from the audio input/output units 8-2 and 8-3 for Tr2 and Tr3 immediately after a sampling operation, since Tr2 has priority over Tr1, DMA transfer through the channel CH2 is performed first. In addition, as will be apparent from the following description, since the channel CH4 has the lowest priority, if data transfer is requested by one of the audio input/output units 8-1 to 8-3 in the process of data transfer between the hard disk 12 and one of the buffers 9-1 to 9-3, the requested data transfer is preferentially performed first.

Subsequently, the current address of a selected channel (e.g., CH2) (the contents of the current address register of the channel CH2 of the address register 104) is output to the address bus (6-8). The direction of DMA transfer is determined with reference to the contents of the control register 105 of the selected channel (e.g., CH2) (6-9). If transfer is to be performed from one of the buffers 9-1 to 9-3 to another component (I/O), the flow advances from 6-10 to 6-11 to supply the read signal RD to the selected one of the buffers 9-1 to 9-3. In contrast to this, if transfer is to be performed from another component (I/O) to one of the buffers 9-1 to 9-3, the flow advances to 6-12 to supply the write signal WR to the corresponding buffer.

Subsequently, the ACK signal DAK is rendered active (6-13). As a result, in this case, with the processing in 5-7 and 5-8 (FIG. 5), the audio input/output unit 8-2 outputs sampled audio data to the data bus, and the DMA controller 10 writes the data in an area, of the buffer 9-2, designated by the current address (see FIG. 8).

In 6-14, since the data transfer is completed, the read or write signal RD or WR and the ACK signal DAK are rendered inactive. In 6-15, the current address (in the address register 104 in FIG. 2) of the corresponding channel (CH2 in this case) is incremented by one. With the operation in 6-15, every time newly sampled audio data is written in one of the buffers 9-1 to 9-3, or new audio data is read out therefrom, the corresponding current address is incremented by one. After the processing in 6-15 is performed, the flow returns to 6-1.

In the previous state (see FIG. 9), the data transfer request signals are output from the audio input/output units 8-2 and 8-3 for Tr2 and Tr3 to the DMA controller 10, and the data transfer has been executed only for Tr2. Therefore, YES is obtained in 6-5. Subsequently, data transfer associated with Tr3 is performed from the audio input/output unit 8-3 to the buffer 9-3 in the same manner as described above by executing the processing in 6-7 to 6-10 and 6-12 to 6-15.

Upon completion of such data transfer, the flow advances from 6-5 to 6-16 to set the DMA enabling signal at "0" (inactive) to inhibit the DMA controller 10 from exclusively using the data bus and the address bus in the DMA unit, thus allowing access from the CPU 1.

The above description is associated with data transfer, in relation to Tr2 and Tr3, from the audio input/output units 8-2 and 8-3 to the corresponding buffers 9-2 and 9-3. In contrast to this, in relation to Tr1, data transfer from the buffer 9-1 to the audio input/output unit 8-1 is performed by the DMA controller 10.

Figure 5:
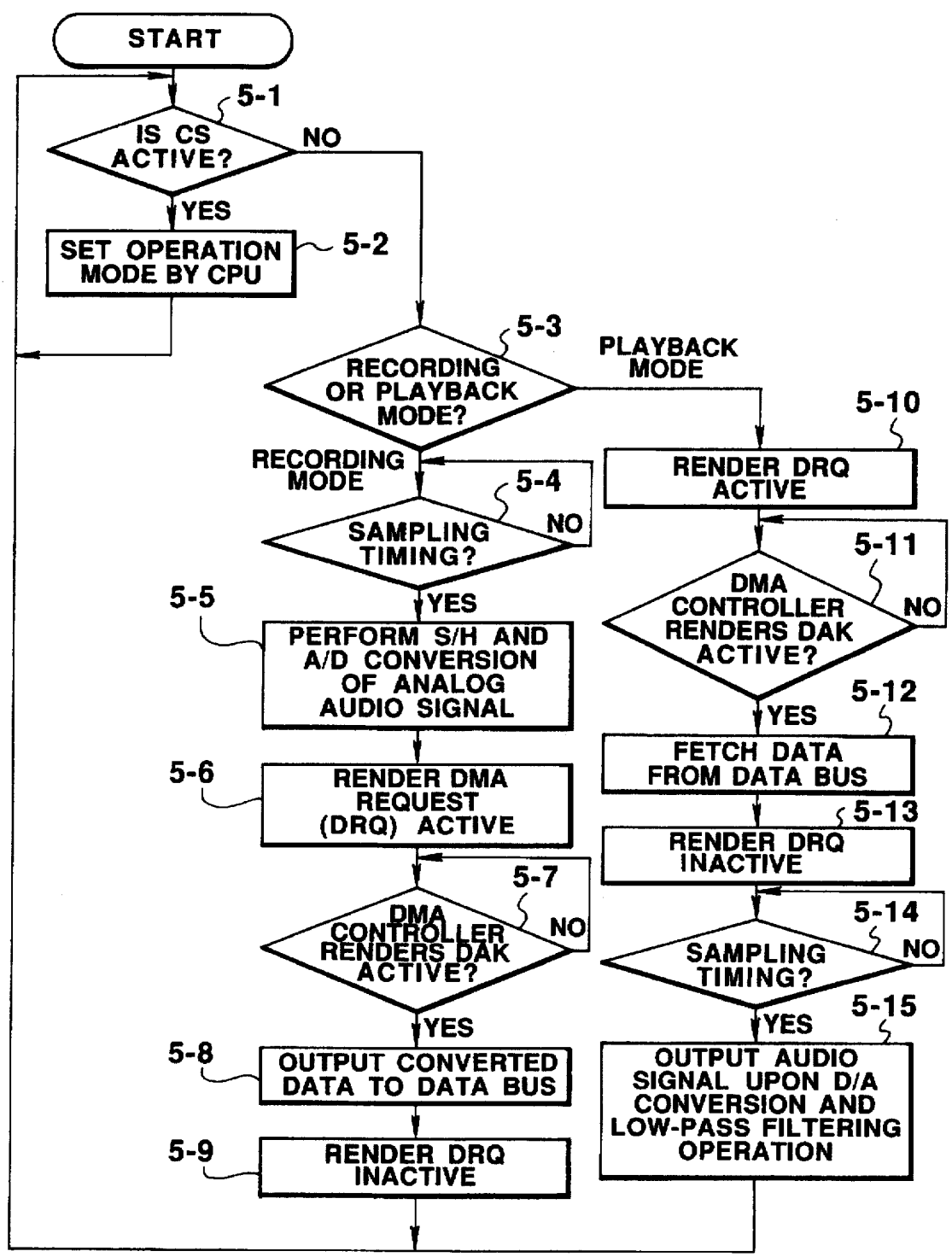
FIG. 5 is a flow chart showing an operation of each of audio input/output units 8-1 to 8-3 in FIG. 1.

As shown in FIG. 9, the audio input/output unit 8-1 corresponding to Tr1 outputs the request signal DRQ to the DMA controller 10 at a timing between the sampling timing t and the sampling timing t+1 (5-10 in FIG. 5).

In response to this request signal, the DMA controller 10 executes the processing in 6-5 to 6-7 in the same manner as described above. In 6-8, address data representing an address, of the buffer 9-1, from which data is read out is output to the address bus. After the processing in 6-9 and 6-10 is completed, the flow advances to 6-11 to supply the read signal RD to the buffer 9-1. In 6-13, the ACK signal DAK is set at "1".

As a result, digital audio data read out from the designated address of the buffer 9-1 is transferred to the audio input/output unit 8-1 through the data bus. Thereafter, the flow returns to 6-1 through 6-14 and 6-15.

In addition, the DMA controller 10 performs data transfer between the hard disk 12 and the buffers 9-1 to 9-3. In this case, the address register 104 and the control register 105 for the channel CH4 are used. This operation is performed upon completion of the setting/control operation with respect to the DMA controller 10 in 4-1 to 4-4 and the programming operation with respect to the HD controller 11 in 4-5 and 4-6 in the execution of the interrupt routine of the CPU 1 (FIG. 4).

In accordance with the setting/control operation in 4-1 to 4-4 with respect to the DMA controller 10 by means of the CPU 1, the DMA controller 10 performs the processing in 6-3 and 6-4. More specifically, the CPU 1 determines a track from which data is to be transferred through the channel CH4, and sets the start address of a buffer corresponding to the track (i.e., an address next to the address of block data previously transferred between a buffer and the hard disk 12) in the start address register (in the address register 104 in FIG. 2) for the channel CH4. Thereafter, the CPU 1 obtains the number of transfer operations for this track from the difference between the start address and the current address (incremented after the previous data transfer between the hard disk 12 and the buffer), and copies the current address of this track as a start address.

The CPU 1 sequentially performs data transfer between the hard disk 12 and the buffers 9-1 to 9-3 corresponding to the currently operated tracks in units of tracks, and performs data transfer subsequent to the previous data transfer (block transfer) in units of tracks. In the case shown in FIG. 8, for example, in relation to Tr1, the amount of data corresponding to a blank portion between the start address (CH1) and the current address (CH1) is transferred from the hard disk 12 (in relation to other tracks, data transfer is performed by the same control as described above, although the direction of the data transfer is opposite to that in the above data transfer). Note that in the buffer in the playback mode (corresponding to the buffer 9-1) and the buffers in the recording mode (corresponding to the buffers 9-2 and 9-3), hatched portions correspond to data portions in which audio data are respectively input.

Upon programing the HD controller 11 in 4-5 and 4-6, the CPU 1 causes the HD controller 11 to actually generate a transfer request so as to start DMA transfer.

Upon detection of the transfer request from the HD controller 11 in 6-5, the DMA controller 10 executes the processing in 6-6 to 6-9 in the same manner as described above, and subsequently checks in 6-10 whether data transfer from the buffers 9-1 to 9-3 to the hard disk 12 is requested or whether data transfer from the hard disk 12 to the buffers 9-1 to 9-3 is requested. If the former data transfer is requested, the flow advances to 6-11. If the latter data transfer is requested, the flow advances to 6-12. In either case, the processing in 6-13 to 6-15 is subsequently performed. In this case, for example, digital audio data corresponding to one sampling operation is transferred by one transfer operation. Therefore, block transfer is performed by repeating the processing in 6-5 to 6-15 a plurality of times. Since this data transfer between the hard disk 12 and the buffers 9-1 to 9-3 is closely related to the operation of the HD controller 11, a more detailed description thereof will be given later.

When the DMA transfer is completed, the request signals DRQ1 to DRQ4 are rendered inactive, and the flow advances from 6-5 to 6-16 to set the DMA enabling signal DMAENB at "0" (inactive).

<Operation of HD Controller 11>

An operation of the HD controller 11 will be described below with reference to FIG. 7. This HD controller 11 may be based on either hard logic control or microprogram control. In either case, the function of the flow chart in FIG. 7 can be realized.

It is checked first whether the command signal CS is supplied from the CPU 1 (7-1). This signal is supplied in the interrupt routine of the CPU 1 (4-5 and 4-6 in FIG. 4). If NO in 7-1, this step is repeated. If YES in 7-1, the flow advances to 7-2 to check whether the read signal RD or the write signal WR is supplied from the CPU 1. If the read signal RD is supplied, designated data (e.g., the contents of an address register) in the HD controller 11 is output to the CPU 1 through the data bus.

If the write signal WR is supplied, the flow advances from 7-2 to 7-4 to set the data transfer direction of DMA transfer between the corresponding buffer and the hard disk 12 through the channel CH4 of the DMA controller 10. In 7-5, an access point on the hard disk 12 is set. This operation is based on the disk access pointer of the corresponding track which the CPU 1 obtains from the RAM 3 (4-5 in FIG. 4).

Subsequently, in 7-6, a transfer data count (digital audio data count) is set in the internal counter of the HD controller 11. This transfer data count is obtained in 4-6 in the interrupt routine of the CPU 1.

Upon execution of the processing in 7-4 to 7-6 in this manner, the HD controller 11 is programmed under the control of the CPU 1. Thereafter, the HD controller 11 outputs a data transfer request signal to the DMA controller 10 (7-7). As is apparent from this description, upon reception of the interrupt signal INT from the HD controller 11, the CPU 1 executes setting/control of DMA transfer corresponding to the next track (i.e., in the order of Tr1, Tr2, Tr3, Tr1, ..., providing that all Tr1 to Tr3 are currently operated) with respect to the DMA controller 10, thus programming the HD controller 11. Thereafter, the CPU 1 transfers control to the HD controller 11 and the DMA controller 10 to cause them to execute actual DMA transfer by means of mutual interaction therebetween.

The HD controller 11 advances from 7-7 to 7-8. The operation in 7-8 is repeated until the ACK signal DACK (DAK4) is received from the DMA controller 10 (see 6-13 in FIG. 6).

If YES in 7-8, the flow advances to 7-9 to transfer digital audio data corresponding to one sampling operation through the channel CH4 of the DMA controller 10. Thereafter, a transfer counter set in 7-6 is decremented by one (7-10). In 7-11, in accordance with the contents of the transfer counter, it is judged whether data transfer corresponding to the preset transfer data count is completed. If NO in 7-11, the flow returns to 7-8. Therefore, the DMA controller 10 continuously receives the transfer request signal DRQ4 from the HD controller 11 until transfer (block transfer) corresponding to the preset data count is completed. That is, the DMA controller 10 executes the processing in 6-5 to 6-15 (FIG. 6) in accordance with this transfer request, while the processing in 7-8 to 7-11 is executed on the HD controller 11 side in response thereto.

When the completion of transfer is determined in 7-11, the flow advances to 7-12 to set the data transfer request signal DREQ (DRQ4) from the HD controller 11 to the DMA controller 10 at "0" (inactive). Thereafter, the HD controller 11 supplies the interrupt signal INT to the CPU 1 to perform data transfer, associated with the next track, between the hard disk 12 and one of the buffers 9-1 to 9-3 (7-13). In response to this request signal, the CPU 1 executes the interrupt routine (FIG. 4), as described above.

<Data Transfer Operation between Hard Disk 12 and Buffers 9-1 to 9-3>

With the above description, data transfer between the hard disk 12 and the buffers 9-1 to 9-3 is also understood. A case wherein a DMA request is generated with respect to the DMA controller 10, and the DMA controller 10 responds to the request in a time-divisional manner will be described below with reference to FIGS. 8 and 10.

As described above, in the state shown in FIG. 8, Tr1 is in a playback state, and Tr2 and Tr3 are in a recording state. In this state, data transfer request signals are supplied from the audio input/output units 8-1 to 8-3 to the DMA controller 10 at every sampling time (time fs in FIG. 10) to request data transfer with respect to the buffers 9-1 to 9-3.

Figure 6:
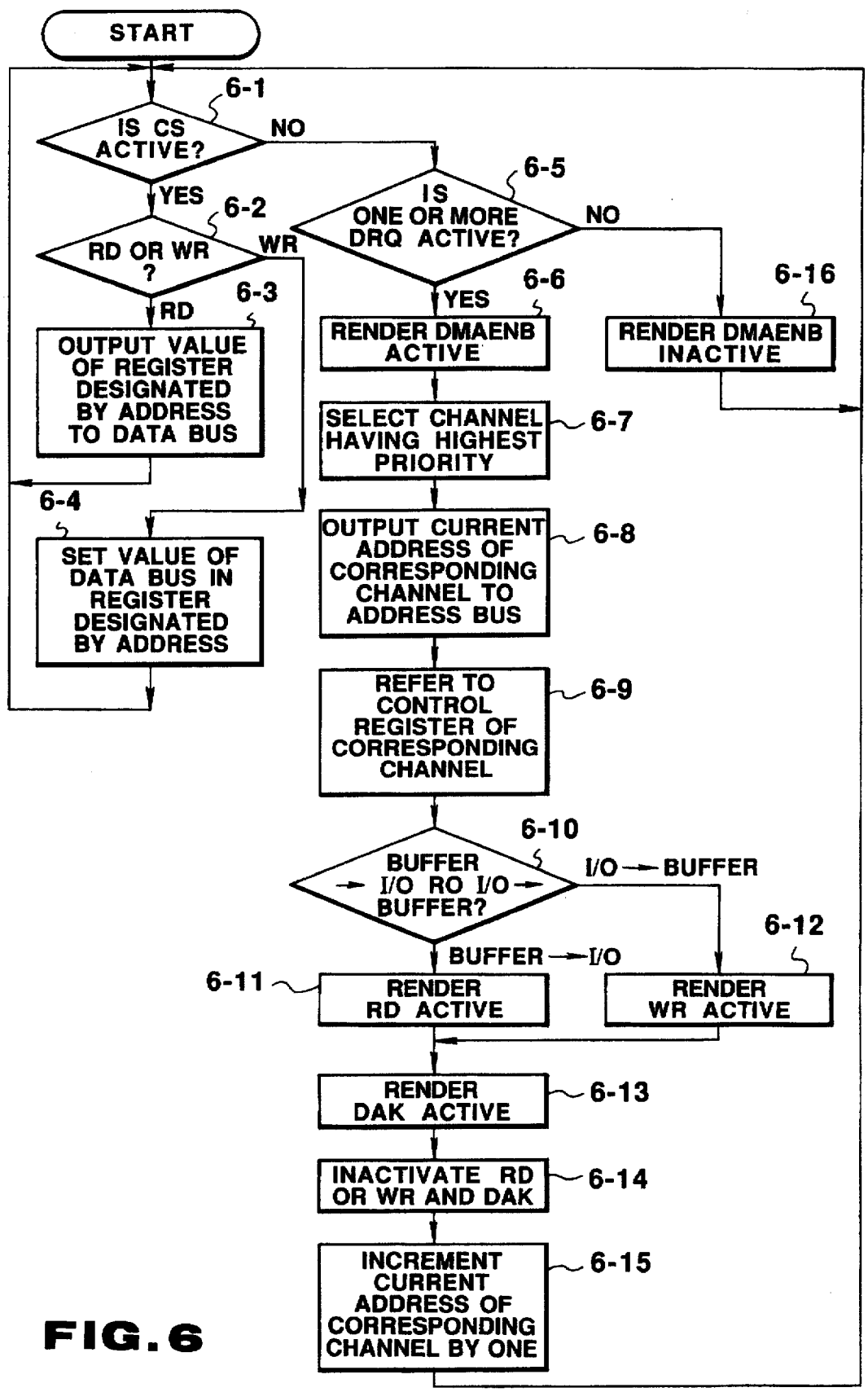
FIG. 6 is a flow chart showing an operation of a DMA controller in FIG. 1.
Figure 7:
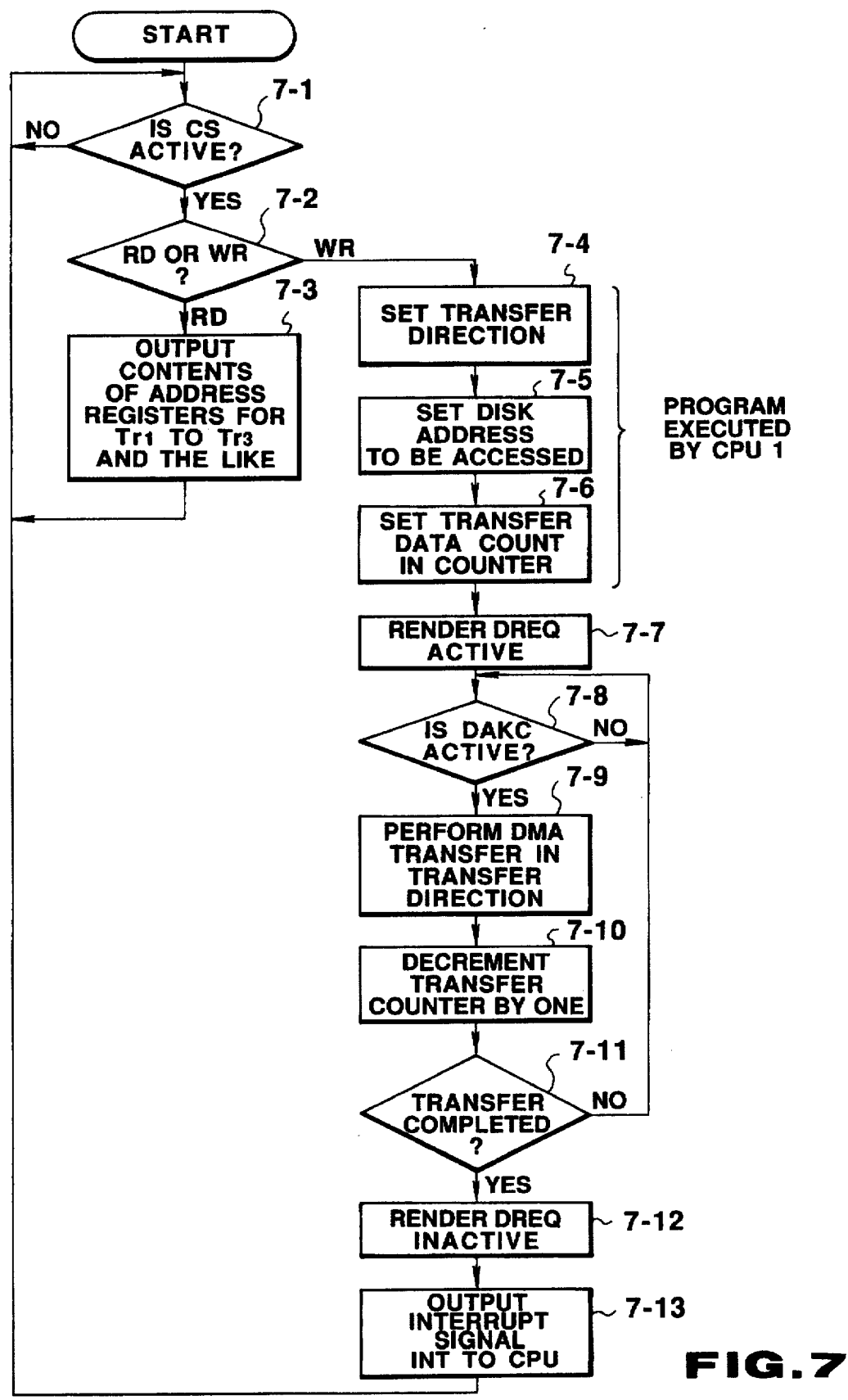
FIG. 7 is a flow chart showing an operation of an HD controller in FIG. 1.

This operation is also performed while the CPU 1 is programming the HD controller 11 (4-5 and 4-6 in FIG. 4, and 7-4 to 7-7 in FIG. 7). In response to the data transfer request signals from the audio input/output units 8-1 to 8-3, the DMA controller 10 outputs the DMA enabling signal DMAENB (6-6 in FIG. 6), as described above, and causes the CPU 1 to stop (WAIT) the programming of the HD controller 11. Upon completion of DMA transfer through the respective channels CH1 to CH3, the DMA controller 10 causes the CPU 1 to resume its programming operation (see FIG. 10).

Figure 10:
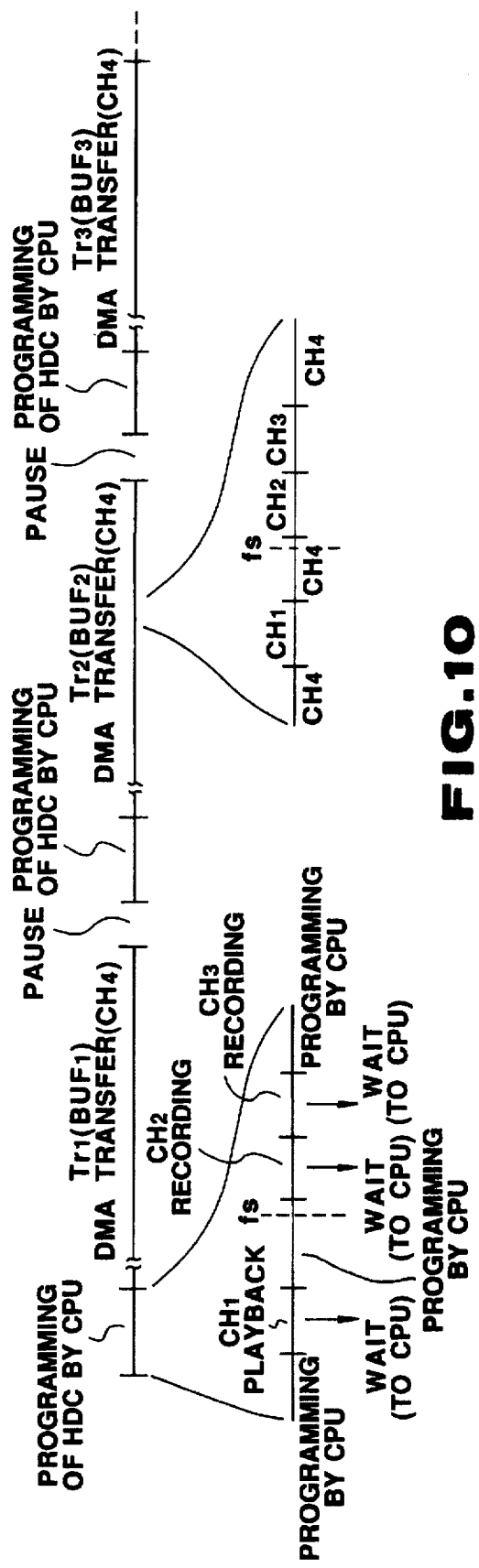
FIG. 10 is a timing chart showing a state of DMA transfer between a hard disk and buffers.

Even while data transfer between the hard disk 12 and the buffers 9-1 to 9-3 is sequentially performed by DMA transfer through the channel CH4, data transfer requests are generated by the audio input/output units 8-1 to 8-3 at each sampling time (fs in FIG. 10).

In this case, upon determination in 6-7 in FIG. 6, data transfer is preferentially performed by the DMA controller 10 through a channel, of the channels (CH1 to CH3), which has higher priority than other channels. During this period, the data transfer request signal DRQ4 is continuously output from the HD controller 11 to the DMA controller 10 (see 7-7 in FIG. 7). However, since the ACK signal DAK4 is not sent from the DMA controller 10, a wait state is kept to wait for the next data transfer (the operation in 7-8 is repeated).

From a macroscopic viewpoint, therefore, as shown in FIG. 10, the DMA controller 10 repeatedly performs DMA transfer (block transfer) for Tr1, Tr2, and Tr3 between the hard disk 12 and the buffers 9-1 to 9-3. From a microscopic viewpoint, however, DMA transfer (signal transfer) between the buffers 9-1 to 9-3 and the audio input/output units 8-1 to 8-3 is executed through the channels CH1 to CH3 at every sampling timing even while the HD controller 11 is being programmed, or actual DMA transfer (through the channel CH4) is being performed, or an idle state is being set, thereby satisfactorily responding to A/D conversion or D/A conversion at every sampling timing in terms of operation speed.

<Recording and Editing Operations>

Figure 11:
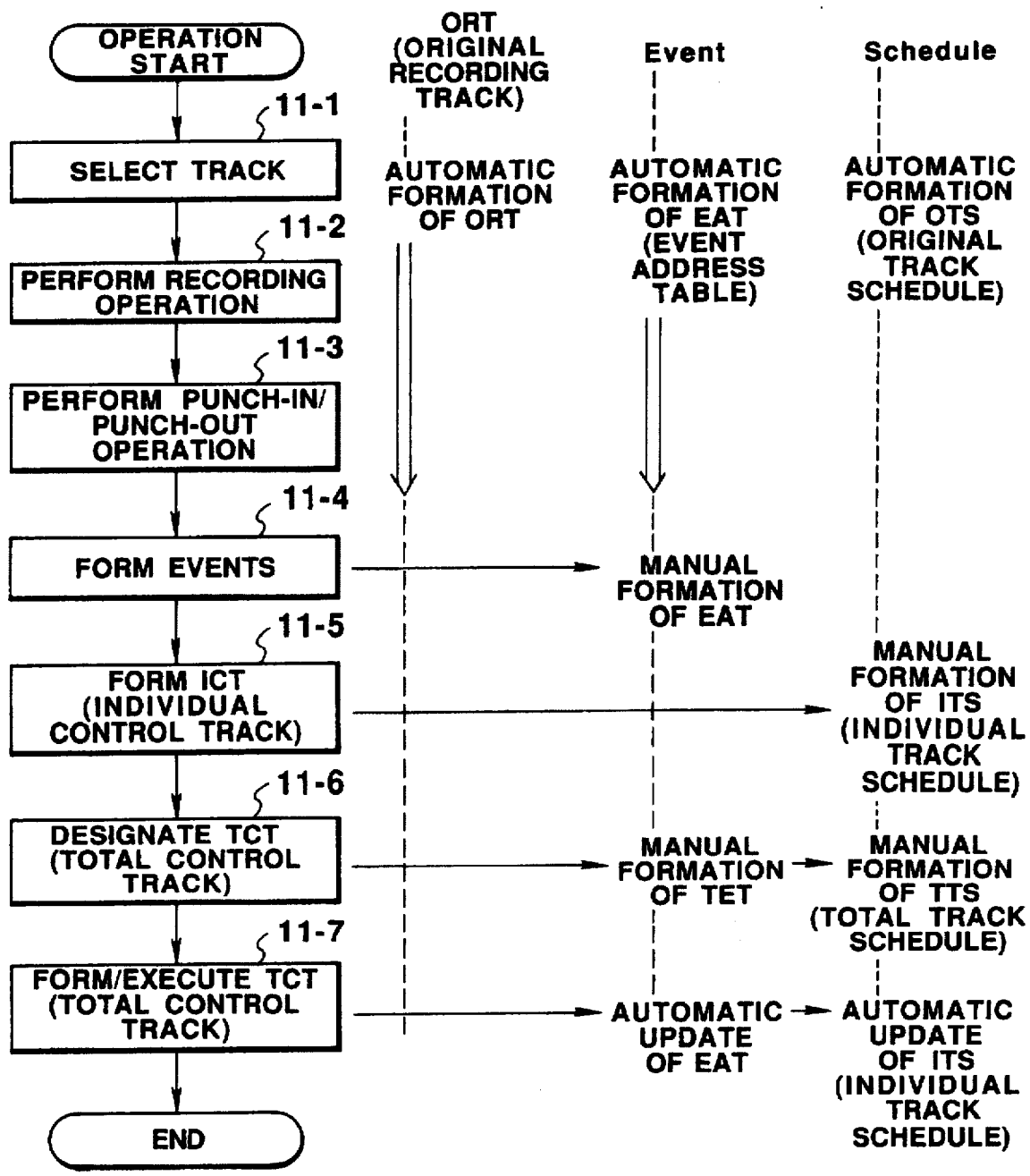
FIG. 11 is a flow chart showing an operation in the embodiment in FIG. 1 with the lapse of time.
Figure 12:
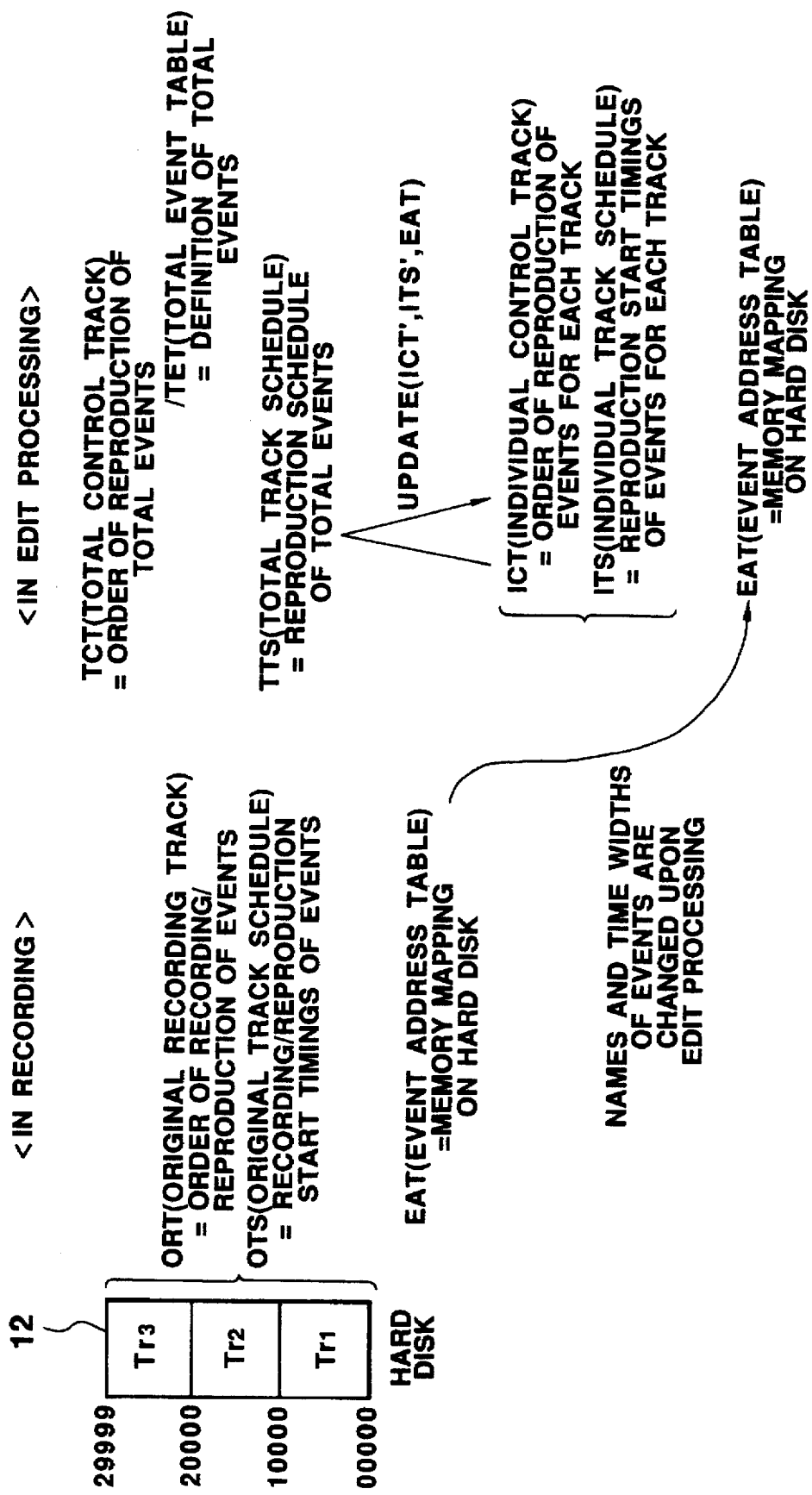
FIG. 12 is a view for explaining the mutual relationship between the respective portions of the embodiment in FIG. 1.

FIG. 11 shows the operation of the embodiment In FIG. 1 with the lapse of time. FIG. 12 shows the mutual relationship between various types of operations in the embodiment in FIG. 1. When track selection and a recording operation are performed in addition to a punch-in/punch-out operation as needed in 11-1, 11-2, and 11-3, an original recording track (ORT), an event address table (EAT), and an original track schedule (OTS) are automatically formed. The ORT is formed by arranging the ID information (event numbers) of events in the order of recording/reproduction and is stored in the RAM 3. The EAT includes the ID information (event numbers) of the events, the storage positions (original track numbers, start points (start addresses), and end points (end addresses)), of the events, on the hard disk 12, and is stored in the RAM 3. The OTS is a table including the recording/reproduction start timings initially set for the respective events or set after the punch-in/punch-out operation, and is stored in the RAM 3.

Figure 13:
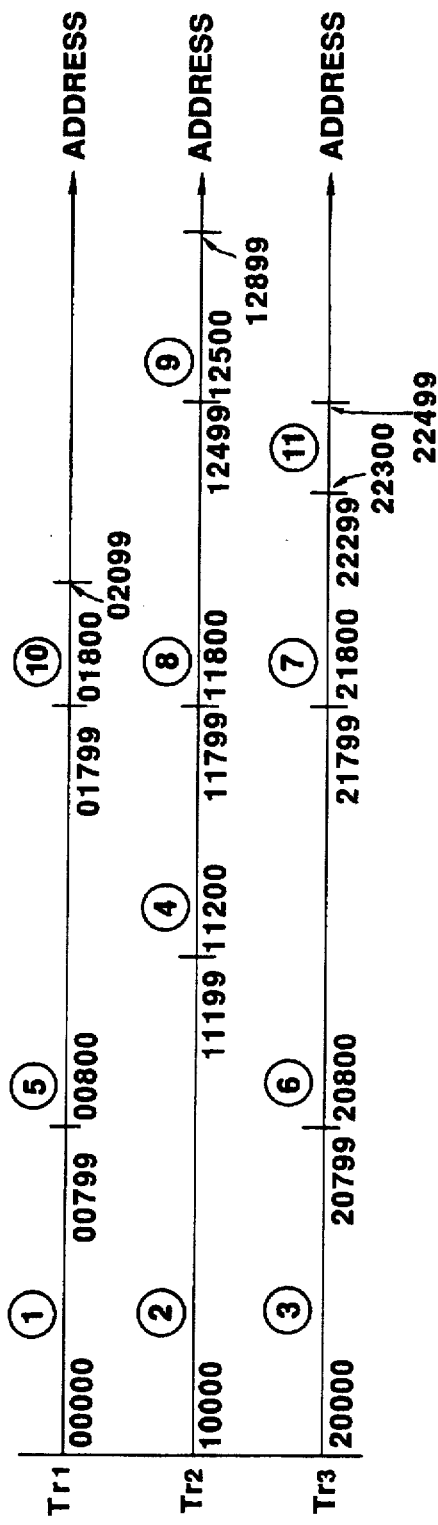
FIG. 13 is a view for explaining the storage positions of events on the hard disk.
Figure 14:
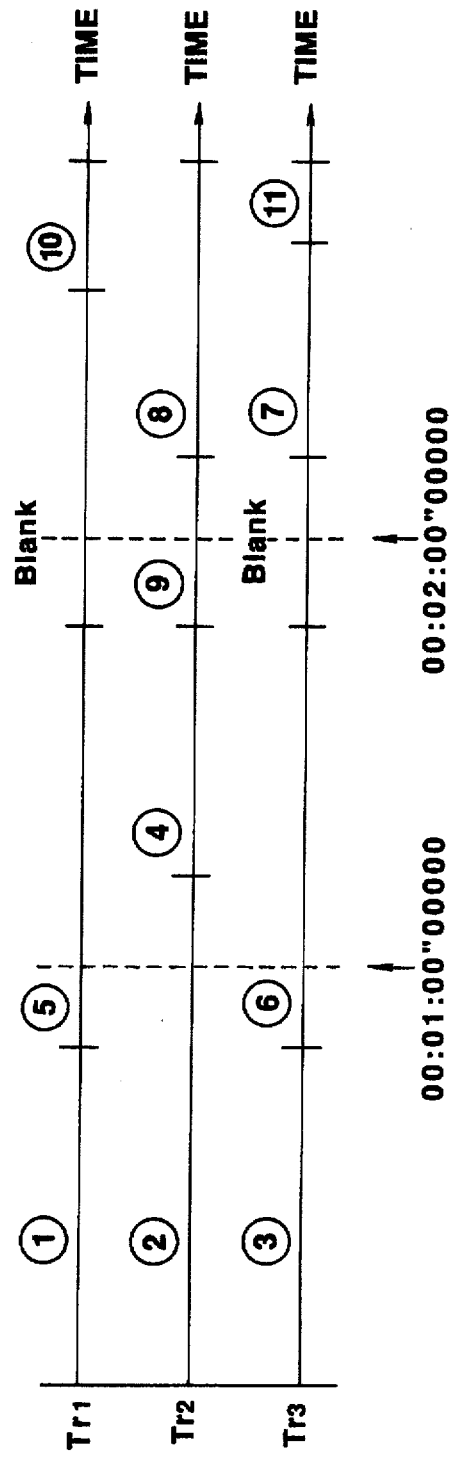
FIG. 14 is a view for explaining an original control track (ORT)

Assume that the storage areas for Tr1, Tr2, and Tr3 are respectively defined by addresses 00000 to 09999, 10000 to 19999, and 20000 to 29999 as shown in FIG. 12, and events 1 to 11 are stored at addresses, in the hard disk 12, shown in FIG. 13. In this case, the EAT has the contents shown in FIG. 16. Note that "E" in the item of "Attribute" in the EAT indicates that a grouping or dividing operation is not performed after the first event is recorded. FIG. 14 shows an ORT corresponding to the storage state in FIG. 13 and the EAT in FIG. 16. The reason why the position of an event 8 is replaced with that of an event 9 in FIGS. 13 and 14 is that although the event 8 is recorded earlier than the event 9, since the event 9 is recorded by a punch-in operation (11-3), the event 9 is reproduced earlier than the event 8. In addition, "Blank" in FIG. 14 indicates that a silent portion is defined as a blank.

FIG. 15 shows an OTS corresponding to the ORT in FIG. 14.

As described above, an EAT is automatically formed in accordance with track selection (11-1), recording (11-2), and a punch-in/punch-out operation (11-3). However, formation of events (11-4) can be manually performed, and an EAT can also be manually formed.

Figure 17:
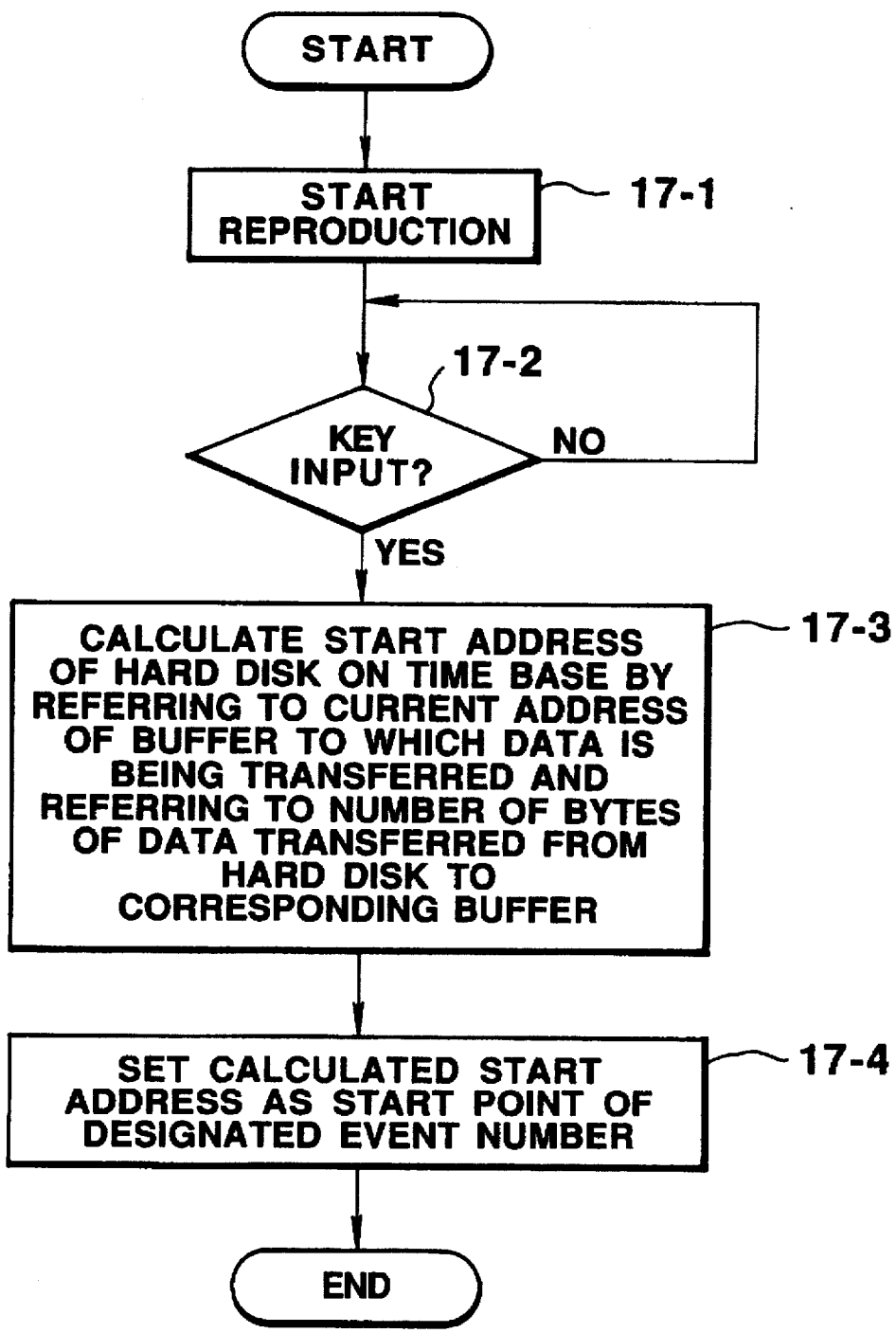
FIG. 17 is a flow chart showing a process for manually designating an event.

FIG. 17 shows manual designation processing for events. In this case, a certain operation switch is depressed in the process of real-time reproduction of an event to designate its start and end points. When reproduction of audio data is started (17-1), the CPU 1 checks the presence/absence of a key input for designating the formation of an event (17-2). When the formation of an event is designated, the CPU 1 calculates a start address, on the time base, of the hard disk 12 by referring to the current address of a buffer (9-1, 9-2, or 9-3) in the process of transfer, and also referring to the number of bytes of data transferred from the hard disk 12 to the buffer (17-3). Thereafter, this start address is set as the start point of the designated event number (17-4). The end point of the event can also be designated by similar arithmetic processing. A description of this processing, however, will be omitted.

According to another method of manual designation of events, the range of an event is designated on the time base on an ICT (individual control track).

Figure 18:
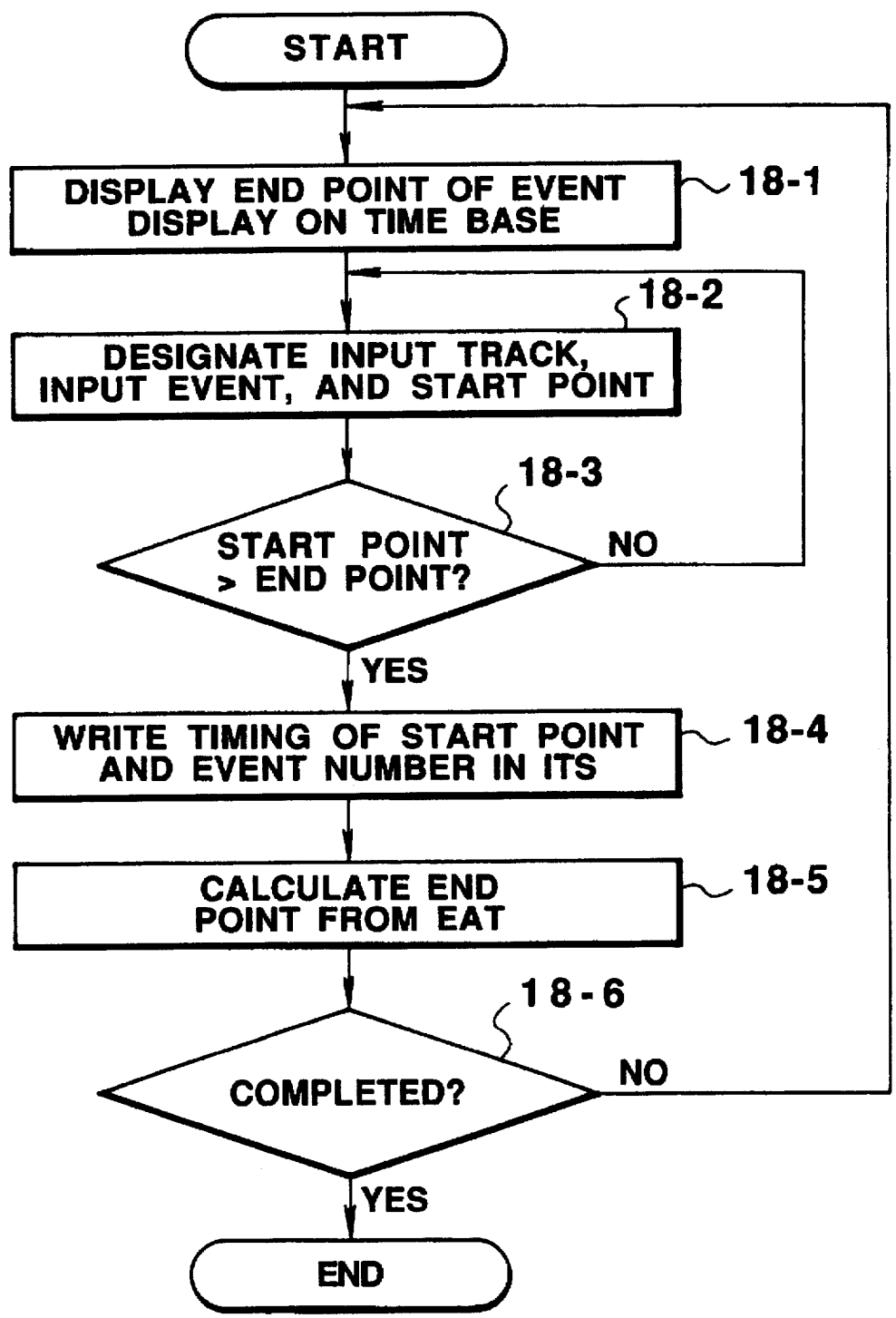
FIG. 18 is a flow chart showing a process for forming an individual control track (ICT)

FIG. 18 shows an example of the ICT formation processing in 11-5 in FIG. 11. This processing is based on the assumption that time is a known factor. The CPU 1 displays a time base and an end point En-1 of a previous event on the display unit 5 (18-1). Subsequently, an operator (user) who performs edit processing operates keys of the keyboard 4 to designate an input track, an input event, and a start point (18-2). The CPU 1 compares a start point Sn designated in 18-2 with the end point En-1 of the previous event. If the former is larger than the latter, the CPU 1 writes the start point time and the event number in an individual track schedule (ITS) (18-4), and calculates an end point En from the EAT (18-5). If it is determined in 18-3 that the start point Sm designated in 18-2 is smaller than or equal to the end point En-1 of the previous event, the CPU 1 waits for designation of a new input track, a new input event, and a new start point. The processing from 18-1 to 18-5 is continuously performed until a stop command is input by the operator through the keyboard 4, thus forming an ICT and an ITS.

Figure 20:
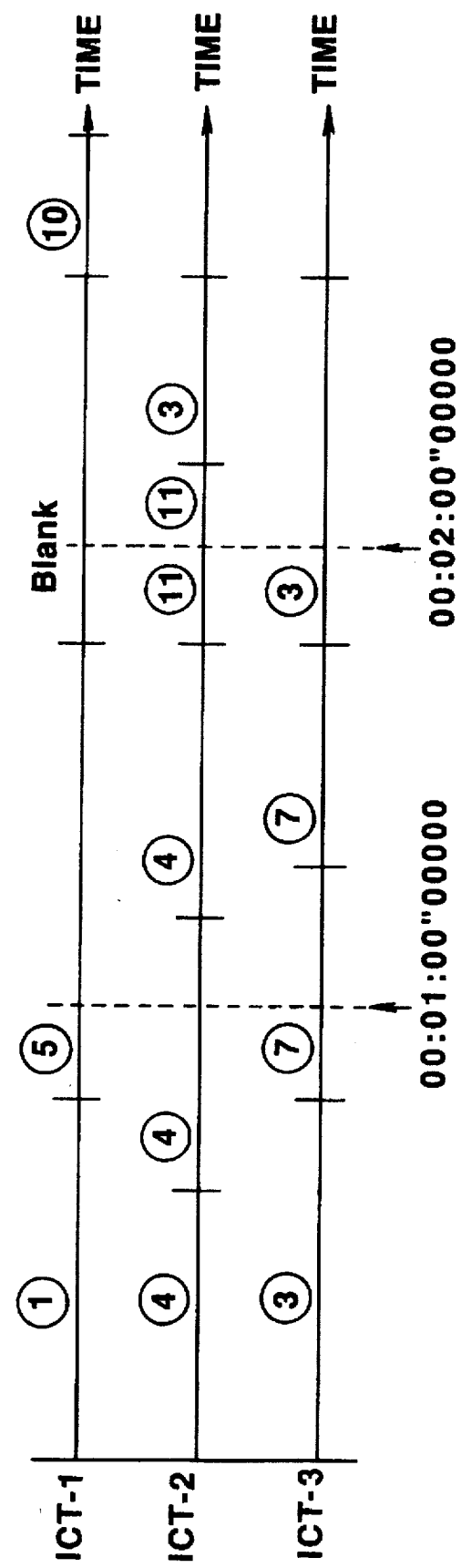
FIG. 20 is a view for explaining an individual control track (ICT)

FIG. 20 shows an ICT formed in this manner. As described above, the ICT is formed by arranging the ID information (event numbers) of events, included in an EAT, in the order of reproducing the events in units of tracks. ICT-1, ICT-2, and ICT-3 in FIG. 20 correspond to Tr1, Tr2, and Tr3, respectively. The ICT is formed by rearranging the ORT in FIG. 14 in accordance with selection (key operation) of the operator.

Figure 19:
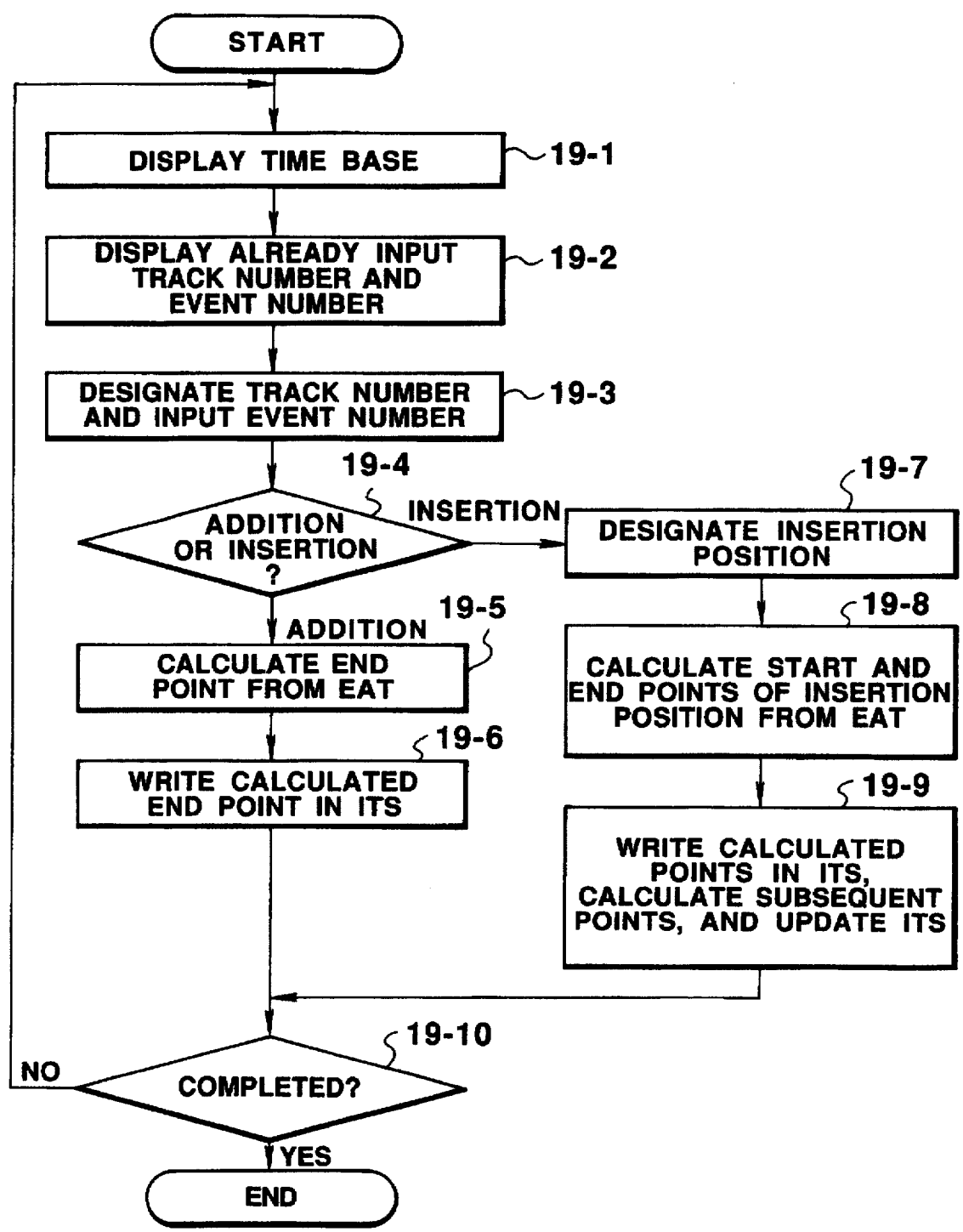
FIG. 19 is a flow chart showing another process for forming an ICT.

FIG. 21 shows an ITS formed as a result of the ICT processing in FIG. 18. The ITS is a table in which the reproduction start timings of the respective events are recorded in units of tracks. The ITS is stored in the FIG. 19 shows another example of the ICT formation processing in 11-5 in FIG. 11. In this processing, the CPU 1 displays a time base on the display unit 5 (19-1). The CPU 1 then displays track numbers and event numbers, which have been already input, on the display unit 5 (19-2). The operator operates keys of the keyboard 4 to designate an input track number and an input event number (19-3). Subsequently, the CPU 1 checks whether addition of an event is selected through the keyboard 4 or whether insertion of an event is selected (19-4). If the CPU 1 determines that addition of an event is selected, it calculates an end point from the EAT (19-5), and writes this end point as the reproduction start timing of the added event in the ITS (19-6).

If the CPU 1 determines in 19-4 that the insertion of an event is selected, it receives a signal for designating an insertion position from the keyboard 4 (19-7). Thereafter, the CPU 1 calculates the start and end points of an insertion position on the basis of the EAT (19-8), and writes the reproduction start timing of the event inserted in the ITS. In addition, the CPU 1 calculates the reproduction start timing of an event subsequent to the inserted event, and updates the ITS (19-9). The processing from 19-1 to 19-9 is repeated until the CPU 1 determines (19-10) that a stop command is input from the keyboard 4, thus forming an ICT and an ITS.

Figure 23:
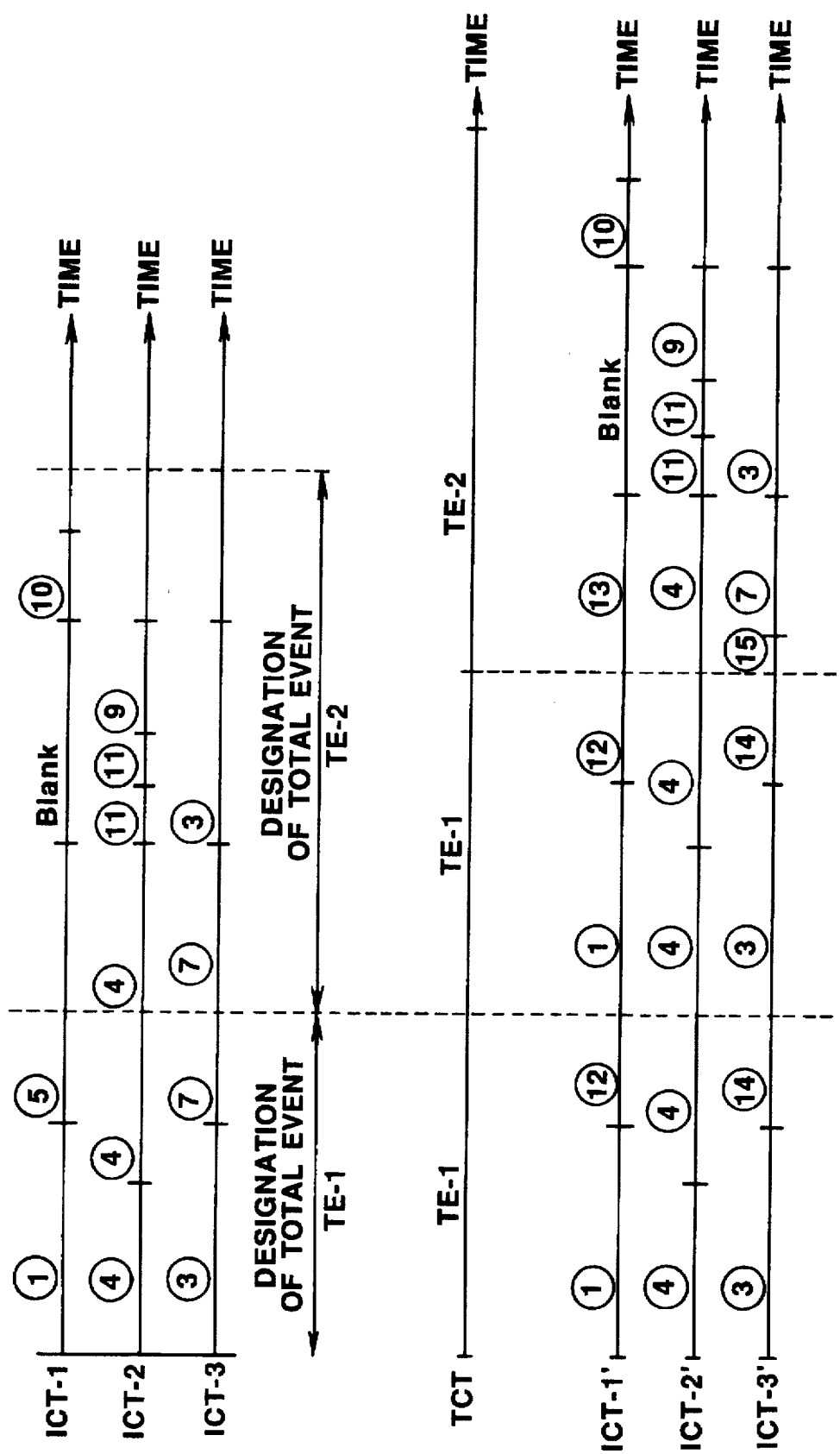
FIG. 23 is a view for explaining the mutual relationship between a TE, a TCT, and an ICT.

When the ICT forming processing (11-5) in Pig. 11 is completed, designation of a total control track (TCT) is performed (11-6). As described above with reference to the processing in 3-20 in FIG. 3, and as shown in FIG. 23, the TCT is formed by arranging the ID information of TEs (TE numbers, e.g., TE-1 and TE-2 in FIG. 23) in the order of reproduction. As described above with reference to the processing in 3-19 in FIG. 3, and as shown in FIG. 23, a TE is one of a plurality (two in FIG. 23) of data obtained by dividing an ICT corresponding to a plurality of tracks (three tracks in Pig. 23) along the time base. Designation of a TE means that the TE is registered in a total event table (TET) with ID information (TE-1 and TE-2 in FIG. 23) assigned to the TE. As shown in FIG. 24, in the TET, TE numbers, start timings, and end timings are arranged in units of TEs. The great difference between the TET and the EAT is that the EAT includes information (original tracks, start points, and end points) representing storage positions on the hard disk 12 as shown in, e.g., FIG. 16, but the TET does not include such information representing positions on the hard disk 12 but includes only information associated with the time base on the ICT.

A total track schedule (TTS) shown in FIG. 25 is formed in relation to the formation of the TET in FIG. 24. The TTS has information representing the reproduction timing of each TE. Each TE can be repeatedly reproduced. In the case shown in FIG. 25, TE-1 is continuously reproduced twice. The difference between the TET and the TTS is that the TET has information representing the position of each TE on the time base of the ICT, but the TTS has the reproduction timing information of each TE. That is, the TET has only one piece of time information (constituted by a combination of a start timing and an end timing) of each TET, but the TTS can have a plurality of pieces of time information associated with each TE.

When the TCT designation (11-6) in FIG. 11 is performed, and the TTS is formed, formation of a total control track (TCT) is executed (11-7). As a result, the EAT and the ITS are automatically updated.

Figure 22:
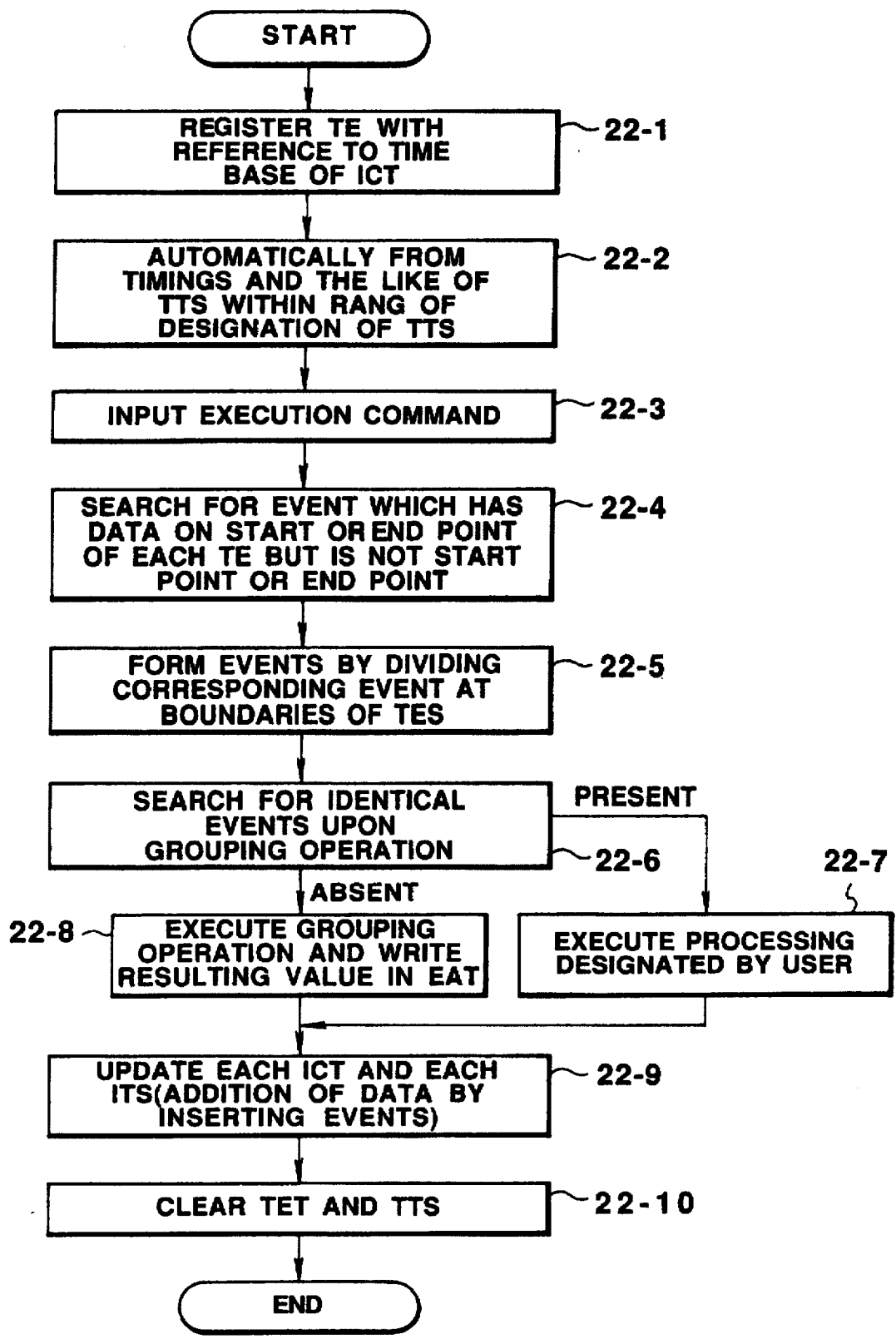
FIG. 22 is a flow chart showing a process for forming/executing a total control track (TCT)

FIG. 22 shows a process for forming a TCT. The CPU 1 displays the time base of an ICT on the display unit 5. The operator registers a TET with reference to the displayed time base through the keyboard 4 (22-1). With this operation, the TET shown in FIG. 24 is formed. Subsequently, when the operator designates a TTS, i.e., designates the order and numbers of times of reproduction of TE-1 and TE-2, the CPU 1 calculates the reproduction timings of TE-1 and TE-2, and automatically forms the TTS shown in Pig. 25 (22-2). At the same time, the TCT shown in FIG. 23 is automatically formed.

When the operator inputs a command for executing the formation of a TCT through the keyboard 4 (22-3), the CPU 1 searches for an event which has data on the start or end point of a TE but is not a start or end point (22-4). If such an event is present, the event is divided at the boundary of TEs to form events (22-5). In addition, the CPU 1 searches for events which become identical to each other as a result of a grouping operation (22-6). Is such events are present, the CPU 1 executes processing designated by the user (operator) (22-7). Otherwise, the CPU 1 executes a grouping operation and writes the resulting value in the EAT (22-8). Subsequently, the CPU 1 performs addition or the like upon insertion of events, thus updating each ICT and each ITS (22-9). Upon completion of this processing, since the TET and the TTS become unnecessary, they are cleared (22-10).

When the formation of the TCT shown in FIG. 22 is completed, the individual control tracks ICT-1, ICT-2, and ICT-3 for three tracks are updated to form ICT-1', ICT-2', and ICT-3', respectively, as shown in FIG. 23. In addition, the individual track schedule (ITS) in FIG. 21 is changed to an ITS shown in FIG. 27. The event address table (EAT) in FIG. 16 is changed to an EAT shown in FIG. 26 or 28. The EAT in FIG. 26 is obtained when the grouping operation in 22-8 in FIG. 22 is not performed. The EAT in FIG. 28 is obtained when the grouping operation is performed. "G" in the item of "Attribute" in FIG. 28 means a grouping operation. For example, an event 5 is obtained by grouping events 12 and 13. Note that events 14 and 15 in the EATs in FIGS. 26 and 28 are formed by dividing an event 7 (i.e., as a result of the processing in 22-5 in FIG. 22) in FIG. 26 and 28.

Subsequently, when a reproduction command is input by the user through the keyboard 4, the CPU 1 refers to ICT-1', ICT-2', and ICT-3' in FIG. 23 (stored in the RAM 3) to generate addresses (stored in the RAM 3), of events to be reproduced by referring to the EAT in FIG. 26 or 28, on the hard disk 12 in accordance with the order of the events arranged in these tables. With this operation, the CPU 1 accesses the hard disk 12 through the HD controller 11 at reproduction timings in the ITS in FIG. 27, thus reproducing the events.

As described above, in the embodiment shown in FIGS. 1 to 28, since edit processing can be performed by designating events, the disk 12 need not be accessed for each editing operation.

<Another Embodiment>

Figure 29:
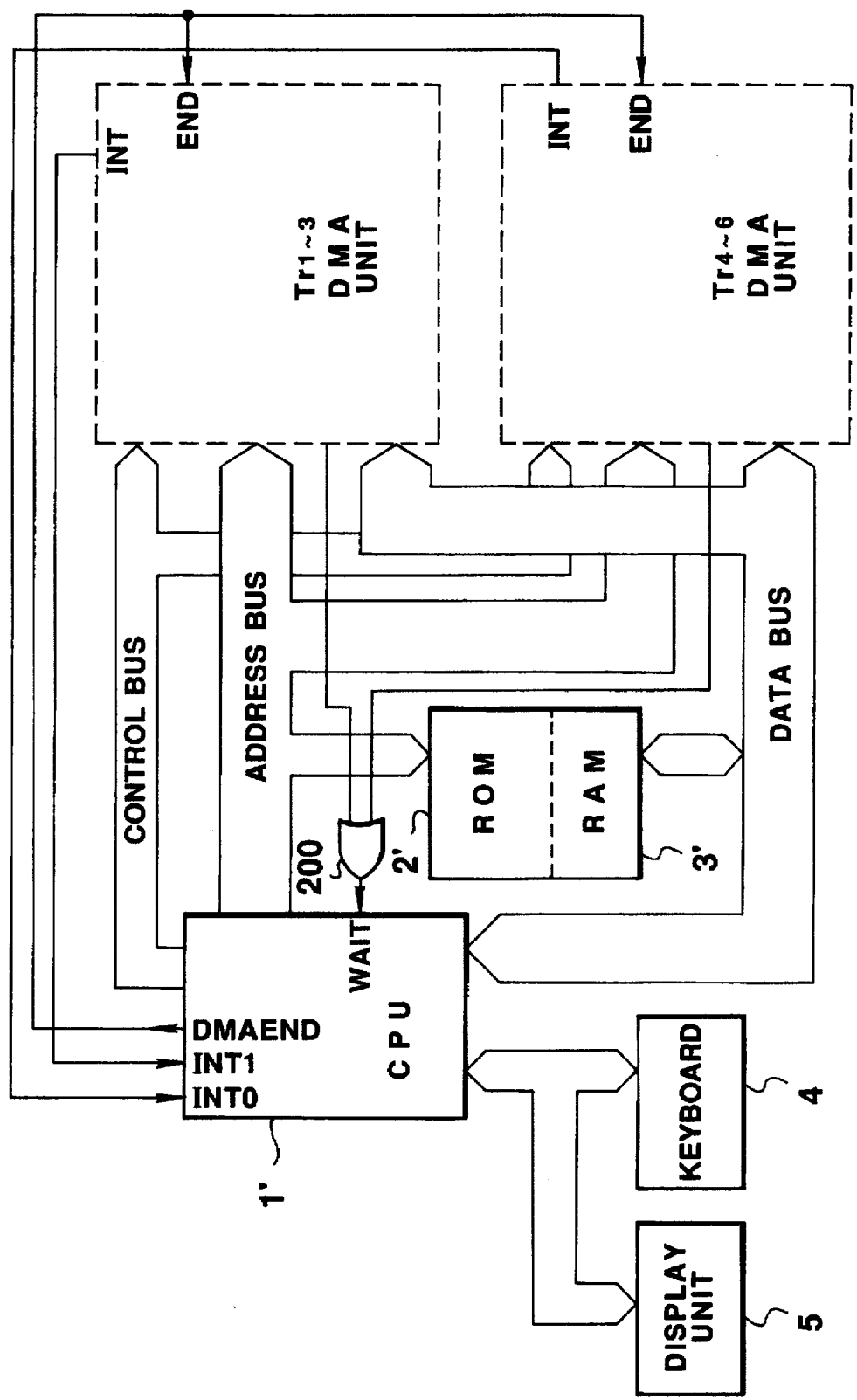
FIG. 29 is a block diagram showing an arrangement of another embodiment of the present invention.

An embodiment of the present invention has been described in detail above various changes and modifications of the present invention can be made. FIG. 29 shows one of them.

FIG. 29 shows an embodiment in which two DMA units, each identical to the DMA unit in the embodiment described above, constitute a digital multitrack recorder of six tracks with one DMA unit used for Tr1 to Tr3 and the other DMA unit used for Tr4 to Tr6. That is, the number of multitracks can be increased with an increase in the number of DMA units.

Referring to FIG. 29, a CPU 1' is connected to the respective units through a control bus, an address bus, and a data bus to perform control and management of six tracks. Interrupt signals INT0 and INT1, each representing the completion of data transfer with respect to a hard disk, are respectively supplied from the DMA units to the CPU 1'.

Similar to the previous embodiment, programs and data which are updated in accordance with the number of tracks, which is twice as large as that in the previous embodiment, are stored in a ROM 2' and a RAM 3'.

As wait signals (WAIT) to the CPU 1', signals from the DMA unit for Tr1 to Tr3 and the DMA unit for Tr4 to Tr6 are supplied through an OR gate 200.

Since other arrangements and functions are same as those of the previous embodiment, a further description will be omitted.

The present invention may further be applied to a digital recorder having an audio input/output unit for performing an input/output operation of an audio signal at a fixed sampling rate, or to a digital multitrack recorder which can change the sampling frequency of each audio input/output unit. If the sampling frequency of each audio input/output unit is changed depending on note frequencies (sampling clocks are generated by a VCO or a digital oscillator) the overall apparatus functions as a polyphonic sampler (sampling electronic musical instrument). In this case, the sampling clock of each audio input/output unit during reproduction (playback) is changed depending on a play operation.

If different sampling frequencies are set for the respective tracks, track control can be performed with a high degree of freedom, e.g., a decrease in data capacity, by assigning low sampling frequencies to tracks which do not require high frequencies.

Figure 30:
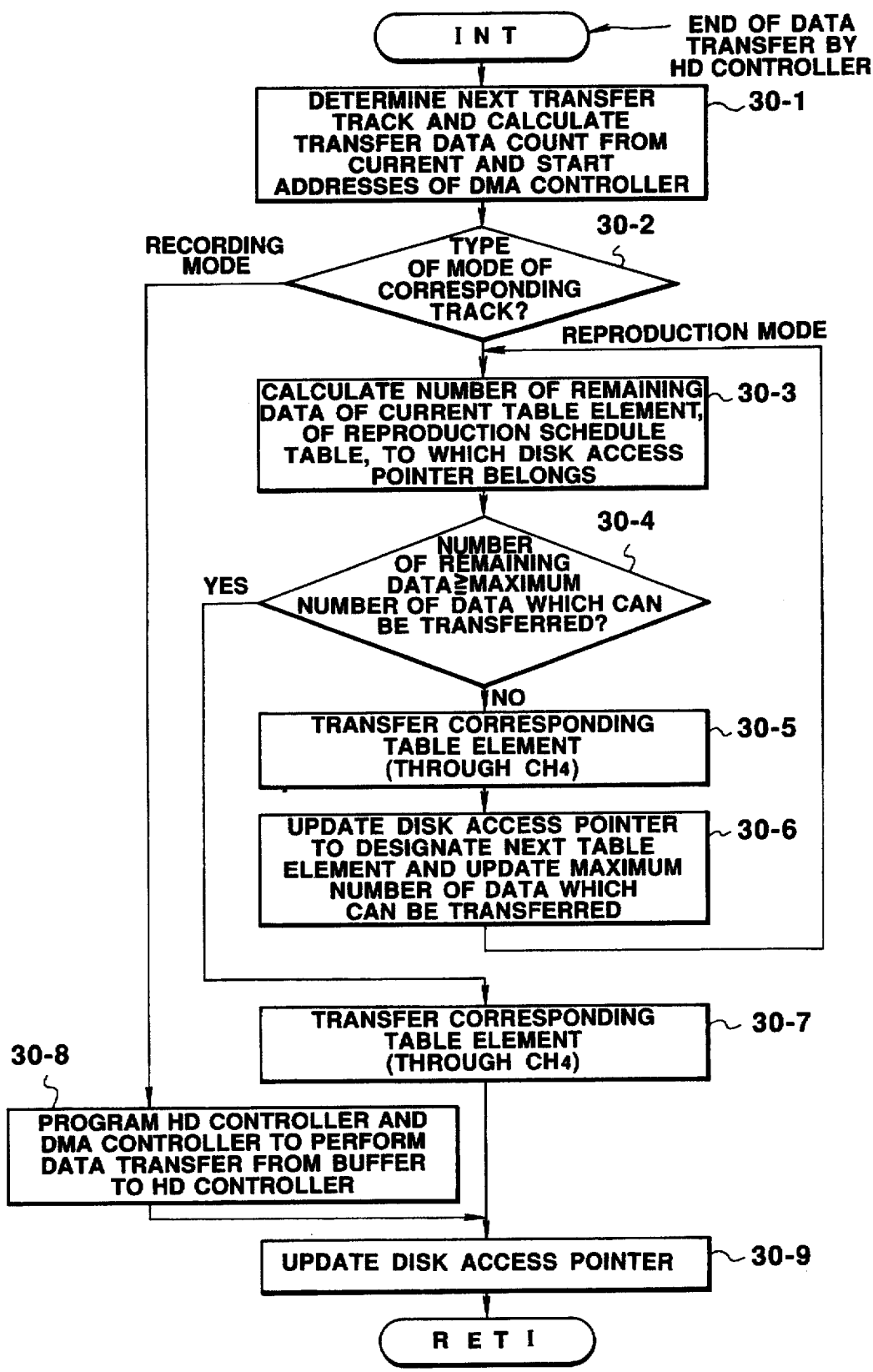
FIG. 30 is a flow chart showing another interrupt routine of a CPU 1 which can be used in place of the interrupt routine of the CPU 1 in FIG. 1.

FIG. 30 shows another interrupt routine of the CPU 1 which can be used in place of the interrupt routine, of the CPU 1, shown in FIG. 4. When the interrupt routine shown in FIG. 30 is to be employed, for example, reproduction schedule tables are stored in the RAM 3 in FIG. 1. Each reproduction schedule table is a table including start and end addresses, of a plurality of events arranged in the order of reproduction, on the disk 12. Such reproduction schedule tables are arranged in units of tracks. FIG. 31 shows a reproduction schedule table for a track 1 corresponding to the event address table shown in FIG. 26.

The interrupt routine in FIG. 30 will be described below. In order to transfer the digital audio data of, e.g., an event 1 of, e.g., Tr1 from the hard disk 12 to the buffer 9-1 by DMA transfer, the channel CH1 corresponding to Tr1 is selected as a channel for the DMA controller 10 (30-1). In addition, a current address and a start address are read out from the area for the channel CH1 of the address register 104 of the DMA controller 10 to calculate the maximum number of data which can be transferred from or to the buffer 9-1 (the amount of data stored in the data storage area of the buffer 9-1, i.e., the maximum number of data which can be transferred from the buffer 9-1, in the recording mode, and the amount of data which can be stored in the empty area of the buffer 9-1, i.e., the maximum number of data which can be transferred to the buffer 9-1, in the reproduction mode) (30-1).

Subsequently, it is checked whether the corresponding track (Tr1 in this case) is in the recording mode or the reproduction mode (30-2). If it is determined that the track is in the recording mode, the DMA controller 10 and the HD controller 11 are programmed to perform data transfer from the buffer 9-1 to the HD controller 10 (30-8). More specifically, the DMA controller 10 is programmed by copying the start address of the channel CH1 on the start address and current address of the channel CH4. The current address of the channel CH4 is incremented every time a unit amount of data is transferred from the buffer 9-1 to the HD controller 11. The HD controller 11 is programmed on the basis of the disk access pointer of Tr1 read out from the work memory of the RAM 3, the maximum number of data which can be transferred from the buffer 9-1 to the HD controller 11, which is calculated in 30-1, and the mode (recording mode) detected in 30-2.

As a result, the HD controller 11, in this case, requests the DMA controller 10 (outputs the request signal DREQ) to perform DMA transfer from the buffer 9-1 to the hard disk 12, and the DMA controller 10 executes corresponding DMA transfer. Subsequently, the CPU 1 changes the value of the disk access pointer to a value to be obtained as a result of the above-described transfer processing (30-9). That is, all subsequent data transfer between the buffer 9-1 and the hard disk 12 is executed by the DMA controller 10, and the CPU 1 sets an address, of the hard disk 12, which is set upon completion of this DMA transfer, in the disk access pointer.

If the reproduction mode is determined in 30-2 in FIG. 4, the CPU 1 calculates the number of remaining data of current table elements in a reproduction schedule table to which the disk access pointer in the RAM 3 belongs (30-3). The reproduction schedule table, as described above and shown in FIG. 31, has one table element constituted by one start address and one end address for each event to be reproduced.

The disk access pointer in the RAM 3 does not indicate the storage position of audio data currently reproduced by one of the audio input/output units 8-1, 8-2, and 8-3 (8-1 in this case) but indicates the start position of a data block which is stored in the hard disk 12 and is to be transferred to one of the buffers 9-1, 9-2, and 9-3 (9-1 in this case). If the value of the disk access pointer is "520", a table element to which the pointer belongs is a table element corresponding to the event 1 in FIG. 31. In this case, the number of remaining data is $$799-(520-1)=280$$

In 30-5, the number of remaining data, obtained in 30-4, and the maximum number of data which can be transferred, obtained in 30-1, are compared with each other. If the maximum amount of data which can be transferred is larger, data indicated by the corresponding table element is transferred to the buffer 9-1 (30-5). If the value of the disk access pointer is "00520", the number of remaining data is 280, and the maximum amount of data is 500, since 280<500, audio data stored at 280 addresses of the disk 12 indicated by the disk access pointer, starting from an address "00520", are transferred to the buffer 9-1.

This data transfer from the disk 12 to the buffer 9-1 is performed by programming the DMA controller 10 and the HD controller 11. The DMA controller 10 is programmed by copying the start address of the channel CH1 on the start and current addresses of the channel CH4. The current address of the channel CH4 is incremented every time a unit amount of data is transferred from the hard disk 12 to the buffer 9-1. The HD controller 11 is programmed on the basis of the value of the disk access pointer (00520 in this case), the number of remaining data of a current table element calculated in 30-3 (280 in this case), and the mode detected in 30-2 (the reproduction mode in this case).

As a result, the HD controller 11 requests (outputs the request signal DREQ) the DMA controller 10 to perform DMA transfer from the hard disk 12 to the buffer 9-1, and the DMA controller 10 executes corresponding DMA transfer. Subsequently, the CPU 1 changes the value of the disk access pointer to a value obtained as a result of execution of this transfer processing (30-6). In the above case (see FIG. 31), the disk access pointer is changed to a value "00800" to indicate the next table element (the table element of an event 12 located at the second highest position in FIG. 31). In addition, the maximum amount of data which can be transferred to the buffer 9-1 is updated (becomes 220 in this case).

The flow returns to 30-3 again to calculate the current table element of the reproduction schedule to which the disk access pointer belongs, i.e., the number of remaining data of the event 12 ("400" between "00800" and "01199"). Subsequently, the number of remaining data (400) and the maximum amount of data which can be transferred to the buffer 9-1 (220) are compared with each other (30-4). In this case, since the number of remaining data is larger than the maximum amount of data which can be transferred, the flow advances from 30-4 to 30-7, and data at 200 addresses from the address "00800" of the hard disk 12 are transferred. The flow then advances to 30-9 to change the value of the disk access pointer to "001020". The flow returns to the main routine (FIG. 3).

FIGS. 32(a) to 32(e) show operations of the buffers 9-1, 9-2, and 9-3 in the reproduction mode when the interrupt routine of the CPU 1 in FIG. 30 is employed. Assume that all the audio input/output units 8-1, 8-2, and 8-3 are in the reproduction mode, and empty areas are present in the buffers 9-1, 9-2, and 9-3 at the same position (audio data are stored in the hatched areas in FIG. 32(a)) because audio data are reproduced, as shown in FIG. 32(a). Since the order of priority is set as Tr1>Tr2>Tr3, data is transferred first from the hard disk 12 to an empty area P in the buffer 9-1 corresponding to Tr1. When the transfer operation is completed, the current address of the buffer 9-1 is set as a start address, as shown in FIG. 32(b). Note that already stored audio data is read out and transferred to the audio input/output unit 8-1 during this period. Thereafter, data is transferred from the hard disk 12 to the buffer 9-2 corresponding to Tr2. When the transfer operation is completed, the current address of the buffer 9-2 is set as a start address, as shown in FIG. 32(c). During this period, already stored audio data is transferred to the audio input/output unit 8-2. Thereafter, data is transferred from the hard disk 12 to an empty area R of the buffer 9-3 corresponding to Tr3. When the transfer operation is completed, the current address of the buffer 9-3 is set as a start address, as shown in FIG. 32(d). During this period, already stored audio data is transferred to the audio input/output unit 8-3.

Assume that audio data stored at the address "520" to the address "799" of the hard disk 12, i.e., part of the data of the event 1, and audio data stored at the address "00800" to the address "001020", i.e., part of the data of the event 12, are transferred to an empty area S of the buffer 9-1 corresponding to Tr1 in the order named. This transfer operation will be described below with reference to FIGS. 30 to 32.

The channel CH1 corresponding to Tr1 is selected as a channel for the DMA controller 10 (30-1 in FIG. 30). In addition, a current address and a start address are read out from the area for the channel CH1 of the address register 104 of the DMA controller 10 to calculate the maximum number of data which can be transferred to the buffer 9-1, i.e., a data amount corresponding to the empty area S of the buffer 9-1 (30-1 in FIG. 30). In this case, the maximum amount of data is 500.

Subsequently, it is checked whether Tr1 is in the recording mode or the reproduction mode (30-2 in FIG. 30). Since the recording mode is set in this case, the CPU 1 calculates the number of remaining data of a current table element in the reproduction schedule in FIG. 31 to which the disk access pointer in the RAM 3 belongs (30-3 in FIG. 30). If the value of the disk access pointer is "520", a table element to which this pointer belongs is the uppermost table element in FIG. 31, and the number of remaining data is $$799-(520-1)=280$$

In 30-4 in FIG. 30, the obtained number of remaining data (280) and the maximum number of data (500) which is calculated in 30-1 in FIG. 30 are compared with each other. Since the latter is larger than the former, audio data stored at 280 addresses, starting from the address "520" indicated by the disk access pointer, i.e., part of the event 1, are transferred to the buffer 9-1 (30-5 in FIG. 30).

Data transfer from the disk 12 to the buffer 9-1 is performed by programming the DMA controller 10 and the HD controller 11. The DMA controller 10 is programmed by copying the start address of the channel CH1 (the start address of the area S shown in FIG. 32(d)) on the start and current addresses of the channel CH4. The current address of the channel CH4 is incremented every time a unit amount of data is transferred from the HD controller 11 to the buffer 9-1. The HD controller 11 is programmed on the basis of the value of the disk access pointer of the RAM 3 (520), the number of remaining data (280) of the current table element which is calculated in 30-3 in FIG. 30, and the mode detected in 30-2 in FIG. 30 (the reproduction mode).

As a result, the HD controller 11 requests (outputs the request signal DREQ) the DMA controller 10 to perform DMA transfer from the hard disk 12 to the buffer 9-1 so as to cause the DMA controller 10 to execute corresponding DMA transfer. Subsequently, the CPU 1 changes the value of the current pointer to a value obtained as a result of the execution of this transfer processing (00800). With this operation, the flow of processing advances to the second table element of the reproduction schedule in FIG. 31, and the maximum number of data which can be transferred is changed to 220 (30-6 in FIG. 30).

The flow returns to 30-3 again to calculate the number of remaining data of the current table element (the second table element) of the reproduction schedule to which the disk access pointer (00800) belongs. In this case, the number of remaining data is $$1199-(800-1)=400$$

Subsequently, the number of remaining data (400) and the maximum number of data which can be transferred to the buffer 9-1 (220) are compared with each other (4-4). Since the number of remaining data is larger in this case, audio data at 220 addresses, starting from the address 00800 of the hard disk 12, i.e., part of the data of the event 12, are transferred to the buffer 9-1 in 30-7. This data transfer is performed by programing the DMA controller 10 and the DH controller 11 in the same manner as described above.

Subsequently, data transfer is performed to the buffers 9-2 and 9-3 corresponding to Tr2 and Tr3. Upon completion of these transfer operations, data transfer to the buffer 9-1 corresponding to Tr1 is performed again.

As described above, by arranging the reproduction schedule table shown in FIG. 31, events to be reproduced can be easily switched. Note that the function of this reproduction schedule table can be realized by a read operation with respect to a combination of the above described individual control track ICT, individual track schedule ITS (FIG. 27), and event address table EAT (FIG. 28). Therefore, the special reproduction schedule table shown in FIG. 31 need not be arranged.

Although the present invention has been described in detail with respect to the particular embodiments, the invention can adopt other various forms. All the modifications and applications fall within the range of the present invention. Therefore, the range of the present invention is to be determined only by its appended claims and their equivalents.

What is claimed is:

1. A system for storing and reading out audio data, comprising:

audio input/output means for performing input/output operations of audio data in correspondence with a plurality of tracks;

audio data direct access storage means having a storage area corresponding to the plurality of tracks, and arranged for storing audio data supplied from said audio input/output means;

event address information storage means for storing identification information and position information of events formed by dividing audio data stored in said audio data direct access storage means into a plurality of portions, said identification information and position information being used for designating respective events;

individual control information storage means for storing the identification information of the events, stored in said event address information storage means, in a designated order of reproduction of the events, for each of the plurality of tracks;

control means for reproducing the events from said audio data direct access storage means in the order of the stored designated order of said identification information;

total control information storage means for storing total control information defining an order of reproduction of a plurality of portions which are obtained by dividing a series of the identification information of the events stored in said event address information storage means for respective tracks; and rewrite means for rewriting said series of identification information for each track, stored in said individual control information storage means, in accordance with said total control information stored in said total control information storage means.

2. A system according to claim 1, further comprising audio data read means for, in reproduction of the audio data, reading out the position information of the respective events from said event address information storage means in accordance with the identification information of the events in the designated order of reproduction events, stored in said individual control information storage means for each of the plurality of tracks, and reading out audio data of corresponding events from said audio data storage means in accordance with the position information.

3. A system according to claim 1, further comprising storage control means for causing said individual control information storage means to store the identification information of the events in the order of reproduction of the events by a manual operation.

4. A digital recorder comprising:

audio input/output means for performing input/output operations of audio data in correspondence with a plurality of tracks;

audio data direct access storage means having a storage area corresponding to the plurality of tracks and arranged for storing audio data supplied from said audio input/output means;

means for storing an event address table including identification information and storage positions of events formed by dividing audio data stored in said audio data direct access storage means into a plurality of portions, said identification information and position information being used for designating respective events;

means for storing an individual control track formed by arranging the identification information of the events, included in said event address table, in an order of reproduction of the events, in units of tracks;

means for reproducing the events from said audio data direct access storage means in said order of reproduction determined by said control track;

means for forming a total control track storing total control information which defines an order of reproduction of a plurality of portions which are obtained by dividing a series of the identification information of the events stored in said event address table for respective tracks; and means for rewriting said series of the identification information of the events included in said individual control track in accordance with said total control information stored in said total control track.

5. A method for storing and reading out audio data, comprising the steps of:

performing input/output operations of audio data in correspondence with a plurality of tracks;

providing audio data direct access storage means having a storage area corresponding to the plurality of tracks, and storing therein audio data supplied by said audio input/output operations;

storing identification information and position information of events formed by dividing audio data stored in said audio data direct access storage means into a plurality of portions, said identification information and position information being used for designating respective events;

storing the identification information of the events in a designated order of reproduction of the events, for each of the plurality of tracks;

reproducing the events from said audio data direct access storage means in the order of the stored designated order of said identification information;

storing total control information defining an order of reproduction of a plurality of portions which are obtained by dividing a series of the stored identification information of the events stored for respective tracks; and rewriting said stored series of identification information for each track in accordance with said stored total control information.

6. A method for digitally recording, comprising the steps of:

performing input/output operations of audio data in correspondence with a plurality of tracks;

providing audio data direct access storage means having a storage area corresponding to the plurality of tracks, and storing therein audio data supplied by said audio input/output operations;

storing an event address table including identification information and storage positions of events formed by dividing audio data stored in said audio data direct access storage means into a plurality of portions, said identification information and position information being used for designating respective events;

storing an individual control track formed by arranging the identification information of the events, included in said event address table, in an order of reproduction of the events, in units of tracks;

reproducing the events from said audio data direct access storage means in said order of reproduction determined by said control track;

forming a total control track storing total control information which defines an order of reproduction of a plurality of portions which are obtained by dividing a series of the identification information of the events stored in said event address table for respective tracks; and rewriting said series of the identification information of the events included in said individual control track in accordance with said total control information stored in said total control track.

* * * * *